US011889128B2

(12) United States Patent
Thagadur Shivappa et al.

(10) Patent No.: US 11,889,128 B2
(45) Date of Patent: Jan. 30, 2024

(54) CALL AUDIO PLAYBACK SPEED ADJUSTMENT

(71) Applicant: QUALCOMM Incorporated, San Diego, CA (US)

(72) Inventors: Shankar Thagadur Shivappa, San Diego, CA (US); Reid Westburg, Del Mar, CA (US); Ferdinando Olivieri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/142,022

(22) Filed: Jan. 5, 2021

(65) Prior Publication Data
US 2022/0217425 A1 Jul. 7, 2022

(51) Int. Cl.
H04N 21/233 (2011.01)
G06F 3/16 (2006.01)
H04N 21/218 (2011.01)
H04N 21/2387 (2011.01)
H04N 21/24 (2011.01)
H04L 41/50 (2022.01)
H04M 1/72445 (2021.01)

(52) U.S. Cl.
CPC .......... H04N 21/233 (2013.01); G06F 3/165 (2013.01); H04L 41/5087 (2013.01); H04M 1/72445 (2021.01); H04N 21/218 (2013.01); H04N 21/2387 (2013.01); H04N 21/2401 (2013.01)

(58) Field of Classification Search
CPC ............... H04N 21/233; H04N 21/218; H04N 21/2387; H04N 21/24; H04M 1/72445; G06F 3/165; H04L 41/5087; H04L 41/50

USPC ............................................... 379/88.13, 900
See application file for complete search history.

(56) References Cited

U.S. PATENT DOCUMENTS 7,826,441 B2    11/2010  Black et al.
2018/0061453 A1*  3/2018  Srinivasan ............ G10L 21/055
2020/0099972 A1*  3/2020  Gerosa ................ H04L 65/1069

FOREIGN PATENT DOCUMENTS

WO       2016167904 A1    10/2016
WO    WO 2016167904    *  10/2016  ............. G10L 19/16

OTHER PUBLICATIONS

International Search Report and Written Opinion—PCT/US2021/072788—ISA/EPO—dated Mar. 9, 2022.

(Continued)

Primary Examiner — Yosef K Laekemariam
(74) Attorney, Agent, or Firm — QUALCOMM Incorporated

(57) ABSTRACT

A device includes one or more processors configured to, during a call, receive a sequence of audio frames from a first device. The one or more processors are configured to, in response to determining that no audio frame of the sequence has been received for a threshold duration since a last received audio frame of the sequence, initiate transmission of a frame loss indication to the first device. The one or more processors are also configured to, responsive to the frame loss indication, receive a set of audio frames of the sequence and an indication of a second playback speed from the first device. The one or more processors are configured to initiate playback, via a speaker, of the set of audio frames based on the second playback speed. The second playback speed is greater than a first playback speed of a first set of audio frames of the sequence.

30 Claims, 17 Drawing Sheets

(56) References Cited

OTHER PUBLICATIONS

Perkins C., "RTP: Audio and Video for the Internet," RTP Audio and Video for the Internet., Jun. 12, 2003 (Jun. 12, 2003), 208 pages, XP055254594, US ISBN: 978-0-672-32249-5 Retrieved from the Internet: URL:http://read.pudn.com/downloads121/eboo k/515800/RTP.pdf [retrieved on Mar. 2, 2016].

* cited by examiner

CALL AUDIO PLAYBACK SPEED ADJUSTMENT

The present disclosure is generally related to adjustment of call audio playback speed.

I. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. Such devices may include communication devices for making calls, such as audio calls or video calls. Network issues during a call between a first user and a second user can cause frame loss such that some audio frames sent by a first device of the first user are not received by a second device of the second user. In some examples, the audio frames are received by the second device but the second user is temporarily unavailable (e.g., has to step away) and misses part of the call. The second user has to guess what was missed or ask the first user to repeat what was missed, which adversely impacts user experience.

II. SUMMARY

According to one implementation of the present disclosure, a device for communication includes one or more processors configured to, during a call, receive a sequence of audio frames from a first device. The one or more processors are also configured to, in response to determining that no audio frame of the sequence has been received for a threshold duration since a last received audio frame of the sequence, initiate transmission of a frame loss indication to the first device. The one or more processors are further configured to, responsive to the frame loss indication, receive a set of audio frames of the sequence and an indication of a second playback speed from the first device. The one or more processors are also configured to initiate playback, via a speaker, of the set of audio frames based on the second playback speed. The second playback speed is greater than a first playback speed of a first set of audio frames of the sequence.

According to another implementation of the present disclosure, a method of communication includes, during a call, receiving, at a device, a sequence of audio frames from a first device. The method also includes, in response to determining that no audio frame of the sequence has been received at the device for a threshold duration since a last received audio frame of the sequence, initiating transmission of a frame loss indication from the device to the first device. The method further includes, responsive to the frame loss indication, receiving, at the device, a set of audio frames of the sequence and an indication of a second playback speed from the first device. The method also includes initiating playback, via a speaker, of the set of audio frames based on the second playback speed, the second playback speed greater than a first playback speed of a first set of audio frames of the sequence.

According to another implementation of the present disclosure, a device for communication includes one or more processors configured to, during a call, receive a sequence of audio frames from a first device. The one or more processors are also configured to, in response to receiving a user request to resume playback and determining that a set of audio frames that is subsequent to a last played audio frame in the sequence is available, initiate playback of the set of audio frames based on a second playback speed, the second playback speed greater than a first playback speed of a first set of audio frames of the sequence.

According to another implementation of the present disclosure, a method of communication includes receiving, at a device, a sequence of audio frames from a first device. The method also includes, in response to receiving a user request to resume playback and determining that a set of audio frames that is subsequent to a last played audio frame in the sequence is available, initiating playback at the device of the set of audio frames at least at a second playback speed. The second playback speed is greater than a first playback speed of a first set of audio frames of the sequence.

Other aspects, advantages, and features of the present disclosure will become apparent after review of the entire application, including the following sections: Brief Description of the Drawings, Detailed Description, and the Claims.

III. BRIEF DESCRIPTION OF THE DRAWINGS

IV. DETAILED DESCRIPTION

Figure 1:
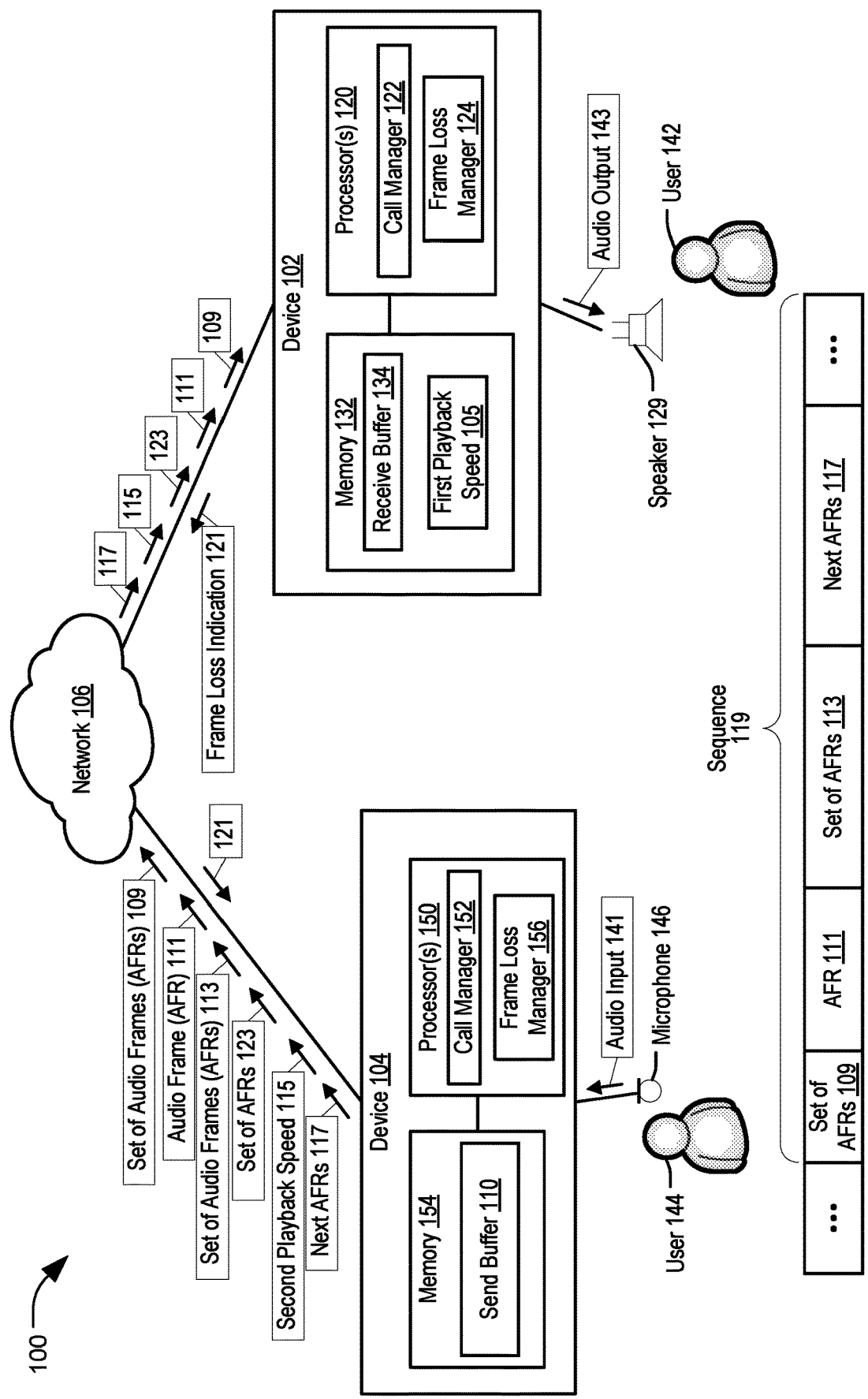
FIG. 1 is a block diagram of a particular illustrative aspect of a system operable to adjust call audio playback speed, in accordance with some examples of the present disclosure.

Missing a portion of a call can adversely impact user experience. For example, during a call between a first user and a second user, if some audio frames sent by a first device of the first user are not received by a second device of the second user, the second user can miss a portion of speech of the first user. As another example, the second user may miss part of the call for other reasons, e.g., steps away or becomes distracted. The second user has to guess what was said by the first user or ask the first user to repeat what was missed. This can cause miscommunication, disrupt the flow of conversation, and waste time.

Systems and methods of call audio playback speed adjustment are disclosed. For example, a first call manager of a first device establishes a call with a second call manager of a second device. The first call manager, during the call, sends a sequence of audio frames to the second device and buffers at least the most recently sent audio frames. The second call manager receives at least some of the sequence of audio frames and buffers the received audio frames for playback.

In a particular example, a second frame loss manager of the second device, in response to detecting a frame loss, sends a frame loss indication to the first device. For example, the second frame loss manager detects the frame loss in response to determining that no audio frames have been received within a particular duration of receiving a last received (e.g., most recently received) audio frame. The frame loss indication indicates the last received audio frame.

A first frame loss manager of the first device, in response to receiving the frame loss indication, resends a set of audio frames to the second device. For example, the set of audio frames is subsequent to the last received audio frame in the sequence. The second call manager plays back the set of audio frames at a second playback speed that is faster than a first playback speed of previous audio frames. In a particular example, the first frame loss manager sends a second set of audio frames that is based on the set of audio frames such that playback of the second set of audio frames at the first playback speed corresponds to an effective second playback speed of the set of audio frames. To illustrate, if the second set of audio frames includes every other frame of the set of audio frames, playback of the second set of audio frames at the first playback speed corresponds to an effective playback speed of the set of audio frames that is twice as fast as the first playback speed. Playing back audio frames at a faster speed (or a faster effective speed) enables the first device to catch up to the call.

In a particular example, the second user pauses audio playback during the call and then resumes audio playback. For example, playback is paused after a last played (e.g., most recently played) audio frame. The second call manager of the second device, in response to determining that playback is to be resumed, plays back a set of audio frames at a second playback speed that is faster than a first playback speed of previous audio frames. The set of audio frames is subsequent to the last played audio frame in the sequence.

The second call manager plays back subsequent audio frames at the first playback speed. In a particular example, the second call manager transitions between the second playback speed and the first playback speed so that the change in playback speed is less noticeable (e.g., not noticeable).

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 120 of FIG. 1), which indicates that in some implementations the device 102 includes a single processor 120 and in other implementations the device 102 includes multiple processors 120. For ease of reference herein, such features are generally introduced as "one or more" features and are subsequently referred to in the singular unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to adjust call audio playback speed is disclosed and generally designated 100. The system 100 includes a device 102 that is coupled, via a network 106, to a device 104.

The device 102 is coupled to a speaker 129. The device 102 includes a memory 132 coupled to one or more processors 120. In a particular example, the memory 132 includes a receive buffer 134 (e.g., a circular buffer) configured to store most recently received audio frames for playback. The memory 132 is configured to store data indicating a first playback speed 105. In a particular aspect, the first playback speed 105 is based on a configuration setting, default data, a user input, or a combination thereof. In a particular implementation, the first playback speed 105 corresponds to a normal (e.g., expected) playback speed for a call. The one or more processors 120 include a call manager 122 and a frame loss manager 124.

The device 104 is coupled to a microphone 146. The device 104 includes a memory 154 coupled to one or more processors 150. In a particular example, the memory 154 includes a send buffer 110 (e.g., a circular buffer) configured to store most recently sent audio frames. The one or more processors 150 include a call manager 152 and a frame loss manager 156.

The call manager 122 and the call manager 152 are configured to manage calls (e.g., audio calls, video calls, or both) for the device 102 and the device 104, respectively. In a particular aspect, the call manager 122 and the call manager 152 correspond to clients of a communication application (e.g., an online meeting application). In a particular aspect, the frame loss manager 124 and the frame loss manager 156 are configured to manage frame loss recovery during calls for the device 102 and the device 104, respectively.

In some implementations, the call manager 122 and the call manager 152 are blind (e.g., unaware) of any frame loss that is managed by the frame loss manager 124 and the frame loss manager 156. In some implementations, the call manager 122 and the call manager 152 correspond to a higher layer (e.g., application layer) of a network protocol stack (e.g., open systems interconnection (OSI) model) of the device 102 and the device 104, respectively. In some implementations, the frame loss manager 124 and the frame loss manager 156 correspond to a lower level (e.g., a transport layer) of the network protocol stack of the device 102 and the device 104, respectively.

In some implementations, the device 102, the device 104, or both, correspond to or are included in one or various types of devices. In an illustrative example, the one or more processors 120, the one or more processors 150, or a combination thereof, are integrated in a headset device that includes a microphone, a speaker, or both, such as described further with reference to FIG. 14. In other examples, the one or more processors 120, the one or more processors 150, or a combination thereof, are integrated in at least one of a mobile phone or a tablet computer device, as described with reference to FIG. 13, a wearable electronic device, as described with reference to FIG. 15, a voice-controlled speaker system, as described with reference to FIG. 16, a camera device, as described with reference to FIG. 17, or a virtual reality headset or an augmented reality headset, as described with reference to FIG. 18. In another illustrative example, the one or more processors 120, the one or more processors 150, or a combination thereof, are integrated into a vehicle that also includes a microphone, a speaker, or both, such as described further with reference to FIG. 19 and FIG. 20.

During operation, the call manager 122 and the call manager 152 establish a call (e.g., an audio call, a video call, an online meeting, or a combination thereof) between the device 102 and the device 104. For example, the call is between a user 144 of the device 104 and a user 142 of the device 102. The microphone 146 captures speech of the user 144 while the user 144 is talking and provides audio input 141 representing the speech to the device 104. The call manager 152 generates a sequence 119 of audio frames based on the audio input 141 and sends the sequence 119 of audio frames to the device 102. For example, the sequence 119 includes a set of audio frames 109, an audio frame 111, a set of audio frames 113, next audio frames 117, one or more additional audio frames, or a combination thereof. To illustrate, the call manager 152 generates audio frames of the sequence 119 as the audio input 141 is being received and sends (e.g., initiates transmission of) the sequence 119 of audio frames as the audio frames are generated.

In a particular aspect, the frame loss manager 156 buffers the audio frames of the sequence 119 in the send buffer 110 as the audio frames are sent by the call manager 152. For example, the call manager 152 sends each of the set of audio frames 109, via the network 106, to the device 102. The call manager 152 sends the audio frame 111 at a first send time, via the network 106, to the device 102. Similarly, the call manager 152 sends each of the set of audio frames 113, via the network 106, to the device 102. The frame loss manager 156 stores each of the set of audio frames 109, the audio frame 111, and each of the set of audio frames 113 in the send buffer 110.

The device 102 receives the sequence 119 of audio frames via the network 106 from the device 104. In a particular implementation, the device 102 receives sets (e.g., bursts) of audio frames of the sequence 119. In an alternative implementation, the device 102 receives one audio frame at a time of the sequence 119.

In a particular example, the frame loss manager 124 receives each of the set of audio frames 109 of the sequence 119 and stores each of the set of audio frames 109 in the receive buffer 134. The call manager 122 retrieves one or more of the set of audio frames 109 from the receive buffer 134 and plays out the retrieved audio frames via the speaker 129 at the first playback speed 105. The set of audio frames 109 is prior to the audio frame 111 in the sequence 119.

The frame loss manager 124 receives the audio frame 111 at a first receipt time. In a particular aspect, the frame loss manager 124 stores the audio frame 111 in the receive buffer 134 for playback (e.g., while one or more of the set of audio frames 109 are being played out at corresponding playback times). For example, the frame loss manager 124 adds a delay between receiving the audio frame 111 and play back by the call manager 122 of the audio frame 111 at a first playback time to increase a likelihood that a subsequent frame is available at a corresponding playback time (e.g., a second playback time) in the receive buffer 134.

In a particular example, the frame loss manager 124 detects frame loss subsequent to receiving the audio frame 111. For example, the frame loss manager 124 detects the frame loss in response to determining that no audio frame of the sequence 119 has been received for a threshold duration since the audio frame 111 (e.g., a last received audio frame of the sequence 119) was received at the first receipt time.

The frame loss manager 124, in response to detecting the frame loss, initiates transmission of a frame loss indication 121 via the network 106 to the device 104. In a particular aspect, the frame loss indication 121 indicates (e.g., includes an identifier of) the audio frame 111 (e.g., the last received audio frame). In another aspect, the frame loss indication 121 includes a request to retransmit previous audio frames corresponding to an estimated playback duration of lost frames at the first playback speed 105. For example, the frame loss manager 124 determines, at a particular time, the estimated playback duration based on the first receipt time (e.g., of the last received audio frame) and the particular time (e.g., the estimated playback duration=particular time−first receipt time).

The frame loss manager 156 receives the frame loss indication 121, via the network 106, from the device 102. In a particular implementation, the frame loss manager 156 determines that the frame loss indication 121 indicates (e.g., includes an identifier of) that the audio frame 111 corresponds to the last received audio frame at the device 102. In an alternative implementation, the frame loss manager 156, in response to determining that the frame loss indication 121 includes a request to retransmit previous audio frames corresponding to the estimated playback duration of the lost frames at the first playback speed 105, identifies a last received audio frame based on the estimated playback duration. For example, the frame loss manager 156 determines, at a particular time, a last send time based on a difference between the particular time and the estimated playback duration (e.g., last send time=particular time−estimated playback duration) and identifies the audio frame 111 as the last received audio frame in response to determining that the last send time matches the send time of the audio frame 111.

The frame loss manager 156 determines, based on the last received audio frame, previous audio frames that are to be retransmitted. For example, the frame loss manager 156, in response to determining that the audio frame 111 corresponds to the last received audio frame at the device 102 and that the set of audio frames 113 is subsequent to the last received audio frame in the sequence 119 and has been previously transmitted, identifies the set of audio frames 113 as the previous audio frames to be retransmitted.

The frame loss manager 156, in response to determining that previous audio frames to be retransmitted include the set of audio frames 113 and that the set of audio frames 113 is available in the send buffer 110, generates a set of audio frames 123 based on the set of audio frames 113 and initiates transmission, via the network 106 to the device 102, of the set of audio frames 123, an indication of a second playback speed 115, or both. The second playback speed 115 is greater than the first playback speed 105. In a particular implementation, the set of audio frames 123 is the same as the set of audio frames 113 and the frame loss manager 156 initiates transmission of the set of audio frames 123 and the indication of the second playback speed 115.

In an alternative implementation, the set of audio frames 123 includes a subset of the set of audio frames 113 such that playback of the set of audio frames 123 at the first playback speed 105 corresponds to an effective playback of the set of audio frames 113 at the second playback speed 115. For example, if the set of audio frames 123 includes every other frame of the set of audio frames 113, playback of the set of audio frames 123 at the first playback speed 105 corresponds to an effective playback speed of the set of audio frames 113 (e.g., the second playback speed 115) that is twice as fast the first playback speed 105. The frame loss manager 156 initiates transmission of the set of audio frames 123 without an indication of the second playback speed 115 because playback of the set of audio frames 123 at the first playback speed 105 (e.g., the normal playback speed) corresponds to an effective playback speed adjustment to the second playback speed 115.

In a particular aspect, the frame loss manager 156 determines the second playback speed 115 based on a count of the set of audio frames 113, a default value, a configuration setting, a user input, or a combination thereof. For example, the second playback speed 115 is higher for a greater number of audio frames that are retransmitted.

In a particular implementation, the frame loss manager 156 at least partially suppresses silence of the set of audio frames 113 in the set of audio frames 123. For example, the frame loss manager 156, in response to determining that the set of audio frames 113 includes a silence frame, transmits an indication of a third playback speed for a corresponding silence frame in the set of audio frames 123. In a particular aspect, the frame loss manager 156 selects fewer silence frames than audio frames of the set of audio frames 113 to generate the set of audio frames 123. For example, the frame loss manager 156 selects every other audio frame of the set of audio frames 113 and selects every fourth silence frame of the set of audio frames 113. The third playback speed is greater than the second playback speed 115. For example, shortening silences can lead to the device 102 to catch up faster to the call (e.g., returning to playing subsequent audio frames at the first playback speed 105).

In a particular implementation, the frame loss manager 156 selectively initiates transmission of the set of audio frames 123 in response to determining that a count of the previous audio frames to be retransmitted is greater than a first threshold, less than a second threshold, or both. For example, if too few audio frames have been lost, the frame loss may not be noticeable enough to perform playback speed adjustment. As another example, if too many audio frames have been lost, playback speed may have to be increased noticeably to catch up to the call and the playback speed adjustment may impact user experience more adversely than the missing audio frames. In a particular aspect, the frame loss manager 156 initiates transmission of the set of audio frames 123, in response to determining that a network link is reestablished with the device 102.

In a particular aspect, the frame loss manager 156, in response to determining that the count of the previous audio frames is less than or equal to the first threshold or greater than or equal to the second threshold, sends a skip ahead notification to the device 102. In a particular aspect, the skip ahead notification indicates a subsequent audio frame to be transmitted by the device 104. For example, the skip ahead notification indicates an initial audio frame of next audio frames 117 of the sequence 119. The frame loss manager 156 initiates transmission of the next audio frames 117 subsequent to (or concurrently with) transmission of the skip ahead notification. The next audio frames 117 are subsequent to the set of audio frames 113 in the sequence 119. In a particular aspect, the next audio frames 117 have not been previously transmitted during the call.

In a particular aspect, the frame loss manager 156, in response to determining that the previous audio frames are to be re-transmitted, initiates transmission of the next audio frames 117 concurrently with the transmission of the set of audio frames 123. For example, the transmission of the set of audio frames 123 (corresponding to the retransmission of at least a subset of the set of audio frames 113) does not delay an initial transmission of the next audio frames 117. In a particular aspect, the next audio frames 117 are associated with a transition from the second playback speed 115 of the set of audio frames 123 (e.g., retransmitted audio frames) and the first playback speed 105 (e.g., the normal playback speed). For example, the frame loss manager 156 transmits a first subset of the next audio frames 117 with an indication of the second playback speed 115, a second subset of the next audio frames 117 with an indication of an intermediate playback speed that is between the second playback speed 115 and the first playback speed 105, a third subset of the next audio frames 117 with an indication of the first playback speed 105, or a combination thereof. In an alternative implementation, the frame loss manager 156 selects first audio frames of the first subset based on the second playback speed 115 (e.g., every other audio frame) and selects second audio frames of the second subset based on the intermediate playback speed. The frame loss manager 156 transitions the next audio frames 117 from the second playback speed 115 to the first playback speed 105 by initiating transmission of the selected first audio frames of the first subset, the selected second audio frames of the second subset, and the audio frames of the third subset.

The frame loss manager 124, responsive to the frame loss indication 121, receives the set of audio frames 123, an indication of the second playback speed 115, or both. The frame loss manager 124 initiates playback, via the speaker 129, of the set of audio frames 123 based on the second playback speed 115, as further described with reference to FIG. 5.

In a particular implementation, the set of audio frames 123 is the same as the set of audio frames 113. The frame loss manager 124 adds the set of audio frames 123 and the indication of the second playback speed 115 to the receive buffer 134. The call manager 122 retrieves one or more of the set of audio frames 123 from the receive buffer 134 and performs playback of the set of audio frames 123 based on the second playback speed 115. To illustrate, the call manager 122 provides, based on the second playback speed 115, each of the set of audio frames 123 to the speaker 129 for playback. In an alternative aspect, the frame loss manager 124 retrieves, based on the second playback speed 115, each audio frame of the set of audio frames 123 from the receive buffer 134 and provides the retrieved audio frame to the call manager 122. The call manager 122 provides each received audio frame to the speaker 129 for playback.

In an alternative implementation, the set of audio frames 123 includes a subset of the set of audio frames 113 such that playback of the set of audio frames 123 at the first playback speed 105 corresponds to an effective playback speed (e.g., the second playback speed 115) of the set of audio frames 113. The frame loss manager 124 adds the set of audio frames 123 to the receive buffer 134. The call manager 122 retrieves one or more of the set of audio frames 123 from the receive buffer 134 and performs playback of the set of audio frames 123 based on the first playback speed 105. To illustrate, the call manager 122 provides, based on the first playback speed 105, each of the set of audio frames 123 to the speaker 129 for playback. In an alternative aspect, the frame loss manager 124 retrieves, based on the first playback speed 105, each audio frame of the set of audio frames 123 from the receive buffer 134 and provides the retrieved audio frame to the call manager 122. The call manager 122 provides each received audio frame to the speaker 129 for playback.

In a particular aspect, the frame loss manager 124 at least partially suppresses silence to initiate playback of the set of audio frames 123. For example, the frame loss manager 124, in response to determining that the set of audio frames 123 includes a silence frame, initiates playback of the silence frame at a third playback speed that is greater than the second playback speed 115. As another example, the frame loss manager 124, in response to receiving an indication of the third playback speed for the silence frame of the set of audio frames 123, initiates playback of the silence frame at the third playback speed.

In a particular example, the frame loss manager 124 adds the silence frame and the indication of the third playback speed to the receive buffer 134, and the call manager 122 performs playback of the silence frame based on the third playback speed. To illustrate, the call manager 122 provides, based on the third playback speed, the silence frame to the speaker 129 for playback. In an alternative aspect, the frame loss manager 124 retrieves, based on the third playback speed, the silence frame from the receive buffer 134 and provides the retrieved silence frame to the call manager 122. The call manager 122 provides the received silence frame to the speaker 129 for playback.

In a particular aspect, the frame loss manager 124 receives the next audio frames 117 concurrently with receiving the set of audio frames 123, as further described with reference to FIG. 4. In a particular aspect, the frame loss manager 124 transitions playback of the next audio frames 117 from the second playback speed 115 to the first playback speed 105, as further described with reference to FIG. 5.

In a particular implementation, the frame loss manager 124 transitions the playback speed of the next audio frames 117 based on indications of playback speeds received for the next audio frames 117. For example, the frame loss manager 124 initiates playback of the first subset of the next audio frames 117 based on the second playback speed 115 in response to receiving an indication of the second playback speed 115 for each of the first subset, initiates playback of the second subset of the next audio frames 117 based on the intermediate playback speed in response to receiving an indication of the intermediate playback speed for each of the second subset, initiates playback of the third subset of the next audio frames 117 at the first playback speed 105 in response to receiving an indication of the first playback speed 105 for each of the third subset, or a combination thereof.

In a particular implementation, the frame loss manager 124 transitions the playback speed of the next audio frames 117 based on the received audio frames of the next audio frames 117. For example, the frame loss manager 124 playback the received audio frames of the next audio frames 117 at the first playback speed 105. Because fewer first audio frames of the first subset of the next audio frames 117 are received, playback of the first audio frames at the first playback speed 105 corresponds to an effective playback speed of the second playback speed 115 for the first subset. Similarly, playback of the second audio frames of the second subset at the first playback speed 105 corresponds to an effective playback speed of the intermediated playback speed for the second subset. Playback of all frames of the third subset of the next audio frames 117 at the first playback speed 105 corresponds to an effective playback speed of the first playback speed 105 for the third subset.

In a particular implementation, the frame loss manager 124 transitions the playback speed of the next audio frames 117 based on a count of audio frames stored (e.g., remaining) in the receive buffer 134 for playback. For example, the frame loss manager 124 initiates playback of a first subset of the next audio frames 117 based on the second playback speed 115 in response to determining that more than a first threshold count of audio frames are available for playback in the receive buffer 134, initiates playback of a second subset of the next audio frames 117 based on an intermediate playback speed between the second playback speed 115 and the first playback speed 105 in response to determining that less than or equal to the first threshold count and more than a second threshold count of audio frames are available for playback in the receive buffer 134, initiates playback of a third subset of the next audio frames 117 at the first playback speed 105 in response to determining that less than or equal to the second threshold count of audio frames are available for playback in the receive buffer 134, or a combination thereof. Transitioning the playback speed of the next audio frames 117 enables the playback speed adjustments to be less noticeable (e.g., not noticeable) and enables the device 102 to return to normal playback speed after catching up with the call.

In a particular implementation, the frame loss manager 124 receives a skip ahead notification responsive to the frame loss indication 121. The frame loss manager 124, in response to receiving the skip ahead notification and receiving the next audio frames 117, initiates playback of the next audio frames 117 at the first playback speed 105.

The system 100 thus enables receiving previously lost audio frames and catching up to a call by playing out audio frames at a faster playback speed. In some aspects, the transmission of the lost audio frames is selective based on a count of lost audio frames to balance effects of gaps in a call caused by the lost audio frames with speeding up the call audio to catch up.

Although the microphone 146 is illustrated as being coupled to the device 104, in other implementations the microphone 146 may be integrated in the device 104. Although the speaker 129 is illustrated as being coupled to the device 102, in other implementations the speaker 129 may be integrated in the device 102. Although one microphone is illustrated, in other implementations one or more additional microphones configured to capture user speech may be included.

It should be understood that the device 104 is described as a sending device and the device 102 is described as a receiving device for ease of illustration. During a call, roles of the device 102 and the device 104 can switch when the user 142 starts speaking. For example, the device 102 can be the sending device and the device 104 can be the receiving device. In a particular aspect, e.g., when both the user 142 and the user 144 are speaking at the same time or at overlapping times, each of the device 102 and the device 104 can be a sending device and a receiving device.

In a particular aspect, the call manager 122 is also configured to perform one or more operations described with reference to the call manager 152, and vice versa. In a particular aspect, the frame loss manager 124 is also configured to perform one or more operations described with reference to the frame loss manager 156, and vice versa. In a particular implementation, each of the device 102 and the device 104 includes a receive buffer, a send buffer, a speaker, and a microphone.

Figure 2:
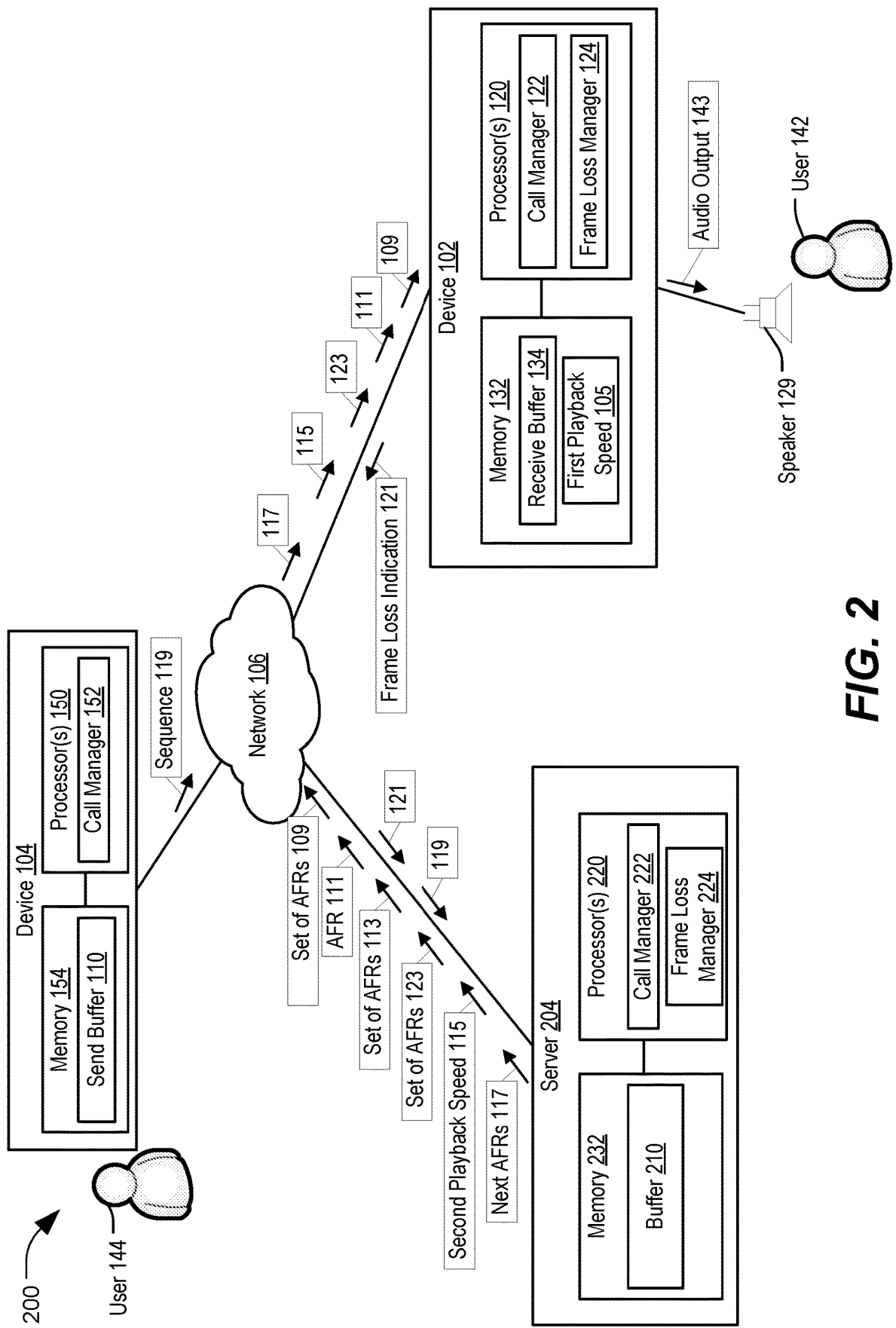
FIG. 2 is a diagram of an illustrative aspect of a system operable to adjust call audio playback speed, in accordance with some examples of the present disclosure.

Referring to FIG. 2, a system configured to adjust call audio playback speed is disclosed and generally designated 200. In a particular aspect, the system 100 of FIG. 1 includes one or more components of the system 200. The system 200 includes a server 204 coupled, via the network 106, to the device 102 and the device 104.

The server 204 includes a memory 232 coupled to one or more processors 220. The memory 232 includes a buffer 210 (e.g., a circular buffer). The one or more processors 220 include a call manager 222 and a frame loss manager 224. In a particular aspect, the frame loss manager 224 corresponds to the frame loss manager 156 of FIG. 1.

The call manager 222 is configured to receive and forward audio frames during a call. For example, the call manager 222 establishes a call between the call manager 152 and the call manager 122. During the call, the call manager 152 captures speech of the user 144 and sends the sequence 119 of audio frames to the server 204. The server 204 stores audio frames of the sequence 119 to the buffer 210 and forwards the audio frames to the device 102.

The frame loss manager 124 sends the frame loss indication 121, as described with reference to FIG. 1, to the server 204 (e.g., instead of the device 104). The frame loss manager 224 of the server 204 manages the frame loss recovery. For example, the device 104 is blind (e.g., unaware) of the frame loss detected at the device 102. To illustrate, the frame loss manager 224 of the server 204 performs one or more operations described with reference to the frame loss manager 156 of FIG. 1.

The system 200 thus enables frame loss recovery for a legacy device (e.g., the device 104). In a particular aspect, the server 204 may also be closer (e.g., fewer network hops) to the device 102 and retransmitting missing audio frames from the server 204 (e.g., instead of from the device 104) may conserve overall network resources. In a particular aspect, the server 204 may have access to network information that can be useful for successfully retransmitting the set of audio frames 113 (e.g., the corresponding set of audio frames 123) to the device 102. As an example, the server 204 initially transmits the set of audio frames 113 via a first network link. The server 204 receives the frame loss indication 121 and, based at least in part on determining that the first network link is unavailable (e.g., down), transmits the set of audio frames 123 using a second network link that appears to be available.

Figure 3:
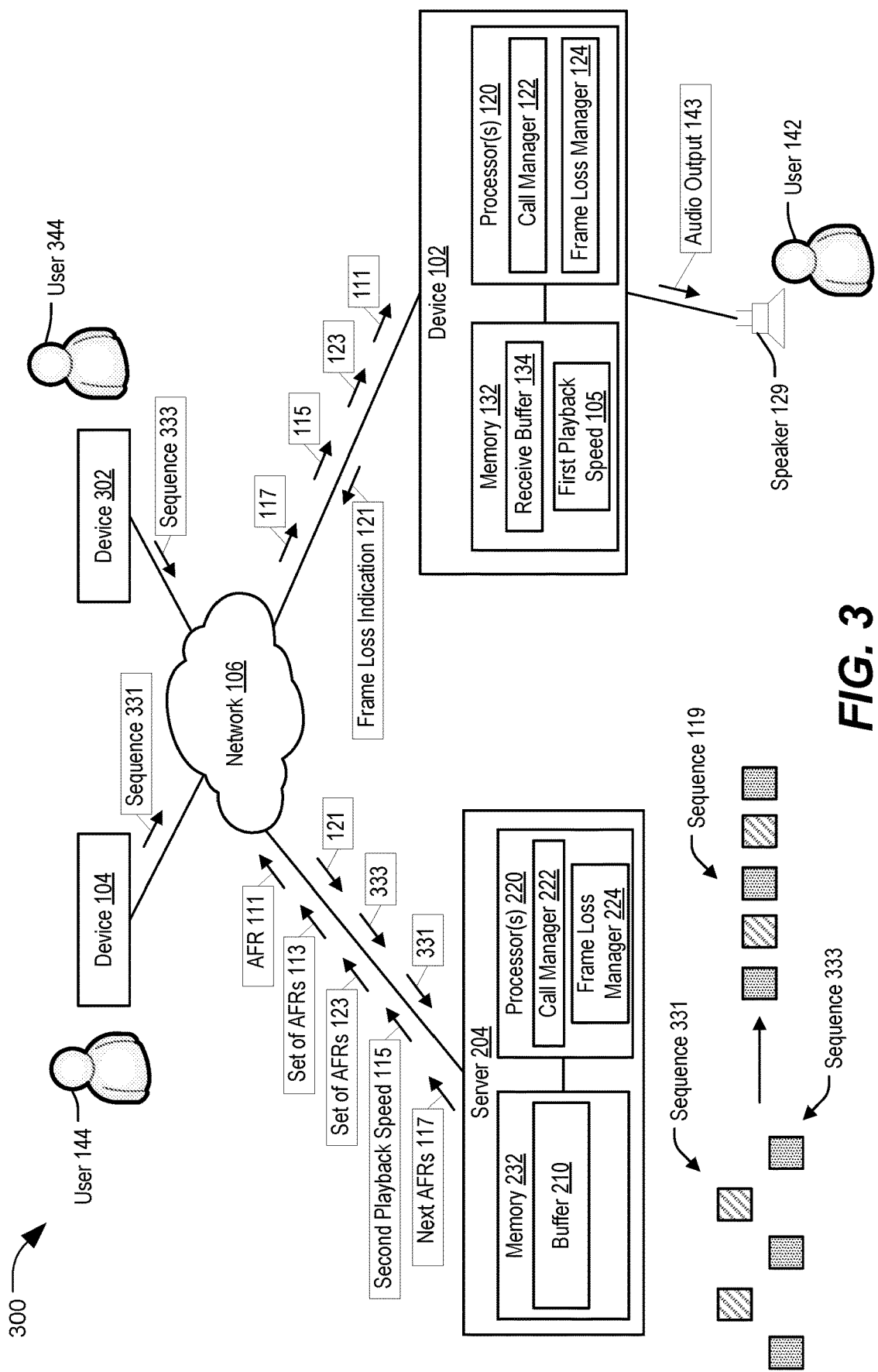
FIG. 3 is a diagram of an illustrative aspect of a system operable to adjust call audio playback speed, in accordance with some examples of the present disclosure.

Referring to FIG. 3, a system configured to adjust call audio playback speed is disclosed and generally designated 200. In a particular aspect, the system 100 of FIG. 1 includes one or more components of the system 300. The system 300 includes a server 204 coupled, via the network 106, to the device 102, the device 104, a device 302, one or more additional devices, or a combination thereof.

The call manager 222 is configured to establish a call between multiple devices. For example, the call manager 222 establishes a call between the user 142 of the device 102, the user 144 of the device 104, and a user 344 of the device 302. During the call, the device 104 captures speech of the user 144 and sends a sequence 331 of audio frames to the server 204 while the device 302 captures speech of the user 344 and sends a sequence 333 to the server 204.

In a particular aspect, the server 204 receives audio frames of the sequence 331 interspersed with receiving audio frames of the sequence 333. For example, the user 144 and the user 344 are speaking one after the other, at the same time, or at overlapping times. The sequence 331 is illustrated as including a plurality of blocks. IT should be understood that each block of a sequence represents one or more audio frames. One block of a sequence may represent the same or different number (e.g., count) of audio frames as another block of the sequence. The server 204 stores the sequence 331 and the sequence 333 in the buffer 210 for the device 102 as the sequence 119. The server 204 initiates transmission of the sequence 119 based at least in part on determining that audio frames of the sequence 119 are available in the buffer 210 for transmission to the device 102.

The server 204 sends audio frames of the sequence 119 to the device 102, receives the frame loss indication 121, and transmits the set of audio frames 123 to the device 102, as described with reference to FIG. 2. In a particular aspect, the server 204 forwards the sequence 333 to the device 104, as described with reference to FIG. 2. In a particular aspect, the server 204 forwards the sequence 331 to the device 302, as described with reference to FIG. 2.

The system 300 thus enables the server 204 to perform frame loss recovery for audio frames received from multiple devices during a call. For example, the playback speed of missed audio frames from the device 104 and the device 302 in the set of audio frames 113 is adjusted similarly in the set of audio frames 123 to retain the relative timing of conversation between the user 144 and the user 344.

Figure 4:
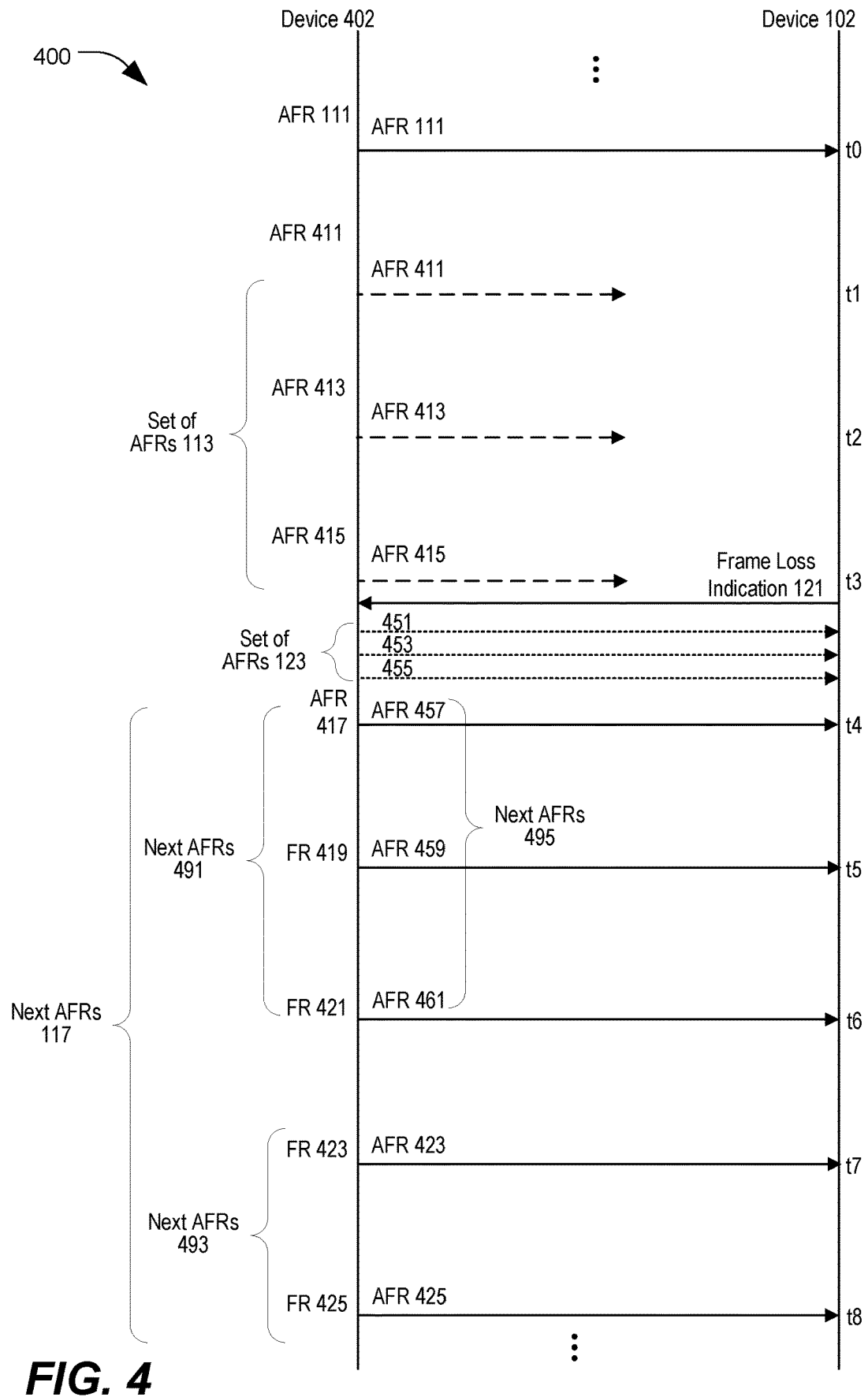
FIG. 4 is a ladder diagram of an illustrative aspect of operation of components of any of the systems of FIGS. 1 to 3, in accordance with some examples of the present disclosure.

Referring to FIG. 4, a diagram is shown and generally designated 400. The diagram 400 indicates an illustrative aspect of operation of components of the system 100 of FIG. 1, the system 200 of FIG. 2, the system 300 of FIG. 3, or a combination thereof. The timing and operations shown in FIG. 4 are for illustration and are not limiting. In other aspects, additional or fewer operations may be performed and the timing may be different.

The diagram 400 illustrates timing of transmission of audio frames of the sequence 119 from a device 402 to the device 102. In a particular aspect, the device 402 corresponds to the device 104 of FIG. 1 or the server 204 of FIGS. 2-3.

The device 402 transmits the audio frame 111 to the device 102. The audio frame 111 is received by the device 102 at a time t0. The device 402 transmits the set of audio frames 113 to the device 102. For example, the device 402 transmits an audio frame 411, an audio frame 413, and an audio frame 415 to the device 102. The audio frame 411, the audio frame 413, and the audio frame 415 are expected (e.g., without network issues) to be received around a time t1, a time t2, and a time t3, at the device 102. The set of audio frames 113 is described as including 3 audio frames for ease of illustration. In other implementations, the set of audio frames 113 includes can include fewer than 3 audio frames or more than 3 audio frames.

The device 102 (e.g., the frame loss manager 124 of FIG. 1) detects frame loss in response to determining, subsequent to the time t3, that no audio frames have been received within a threshold duration (e.g., threshold duration is less than or equal to the difference between time t3 and time t0) of the time t0 of receipt of the audio frame 111.

The device 102 (e.g., the frame loss manager 124), in response to detecting the frame loss, transmits the frame loss indication 121 to the device 402. In a particular aspect, the frame loss indication 121 indicates the audio frame 111 (e.g., an identifier of the audio frame 111 or a playback duration of missed audio frames) as the last received audio frame of the sequence 119, as described with reference to FIG. 1.

The device 402, in response to receiving the frame loss indication 121 and determining that the set of audio frames 113 corresponds to the previous audio frames that have not been received by the device 102, generates the set of audio frames 123 based on the set of audio frames 113, as described with reference to FIG. 1. For example, the set of audio frames 123 includes an audio frame 451, an audio frame 453, an audio frame 457, one or more additional frames, or a combination thereof, that are based on the audio frame 411, the audio frame 413, the audio frame 415, one or more additional frames, or a combination thereof, of the set of audio frames 113. In a particular implementation, the set of audio frames 123 includes the same audio frames as the set of audio frames 113. In an alternative implementation, the set of audio frames 123 includes a subset of the set of audio frames 113.

The device 402 transmits the set of audio frames 123 to the device 102. In a particular aspect, the set of audio frames 123 is transmitted as a single transmission to the device 102. In an alternative aspect, one or more audio frames of the set of audio frames 123 are transmitted to the device 102 with a shorter transmission interval as compared to an initial transmission of audio frames of the sequence 119 to the device 102. For example, in normal operation, audio frames are expected to be transmitted or received at an expected interval (e.g., an average of a difference between the time t1 and the time t0, a difference between the time t2 and the time t1, a difference between the time t3 and the time t2, etc.). The device 102 transmits the set of audio frames 123 with a shorter than the expected interval.

In a particular aspect, the next audio frames 117 transition from the second playback speed 115 to the first playback speed 105. For example, the device 402 generates next audio frames 495 based on a first subset (e.g., next audio frames 491) of the next audio frames 117. The next audio frames 495 have the second playback speed 115. A second subset (e.g., next audio frames 493) have the first playback speed 105.

In a particular implementation, the next audio frames 495 include the same audio frames as the next audio frames 491. For example, an audio frame 457, an audio frame 459, and an audio frame 461 of the next audio frames 495 is the same as an audio frame 417, an audio frame 419, and an audio frame 421, respectively, of the next audio frames 491. The device 402 transmits the next audio frames 495 with an indication of the second playback speed 115 for each of the next audio frames 495. The device 102 receives the audio frame 457 at a time t4 (e.g., an expected receipt of the audio frame 417). The device 102 receives the audio frame 459 at a time t5 (e.g., an expected receipt time of the audio frame 419). The device 102 receives the audio frame 461 at a time t6 (e.g., an expected receipt time of the audio frame 421).

In a particular implementation, the next audio frames 495 include a subset (e.g., every other audio frame) of the next audio frames 491. As an illustrative example, the device 402 transmits the audio frame 457 (e.g., based on the audio frame 417) and the audio frame 461 (e.g., based on the audio frame 421) without transmitting any audio frame (e.g., the audio frame 459) based on the audio frame 419. In this example, the device 102 receives the audio frame 457 at the time t4, does not receive the audio frame 459, and receives the audio frame 461 at the time t5. Since the next audio frames 495 include a subset of the next audio frames 491, playback of the next audio frames 495 at the first playback speed 105 corresponds to an effective playback speed (e.g., the second playback speed 115) of the next audio frames 491 that is greater than the first playback speed 105.

In a particular example, the device 402 transmits the set of audio frames 123 concurrently with transmission of the next audio frames 117. For example, the device 402 transmits the audio frame 457 at an expected transmission time of the audio frame 417 that is based on a transmission time of the audio frame 415 and an expected transmission interval (e.g., a default transmission interval).

The device 402 transmits the next audio frames 493 (e.g., an audio frame 423, an audio frame 425, one or more additional audio frames, or a combination thereof) at the first playback speed 105. For example, the device 102 receives the audio frame 423 at a time t7, the audio frame 425 at a time t8, or both.

The diagram 400 thus illustrates that transmission of the set of audio frames 123 does not delay transmission of the next audio frames 117. In a particular implementation, the next audio frames 117 transition from the second playback speed 115 to the first playback speed 105. For example, the next audio frames 491 have the second playback speed 115 and the next audio frames 493 have the first playback speed 105.

Figure 5:
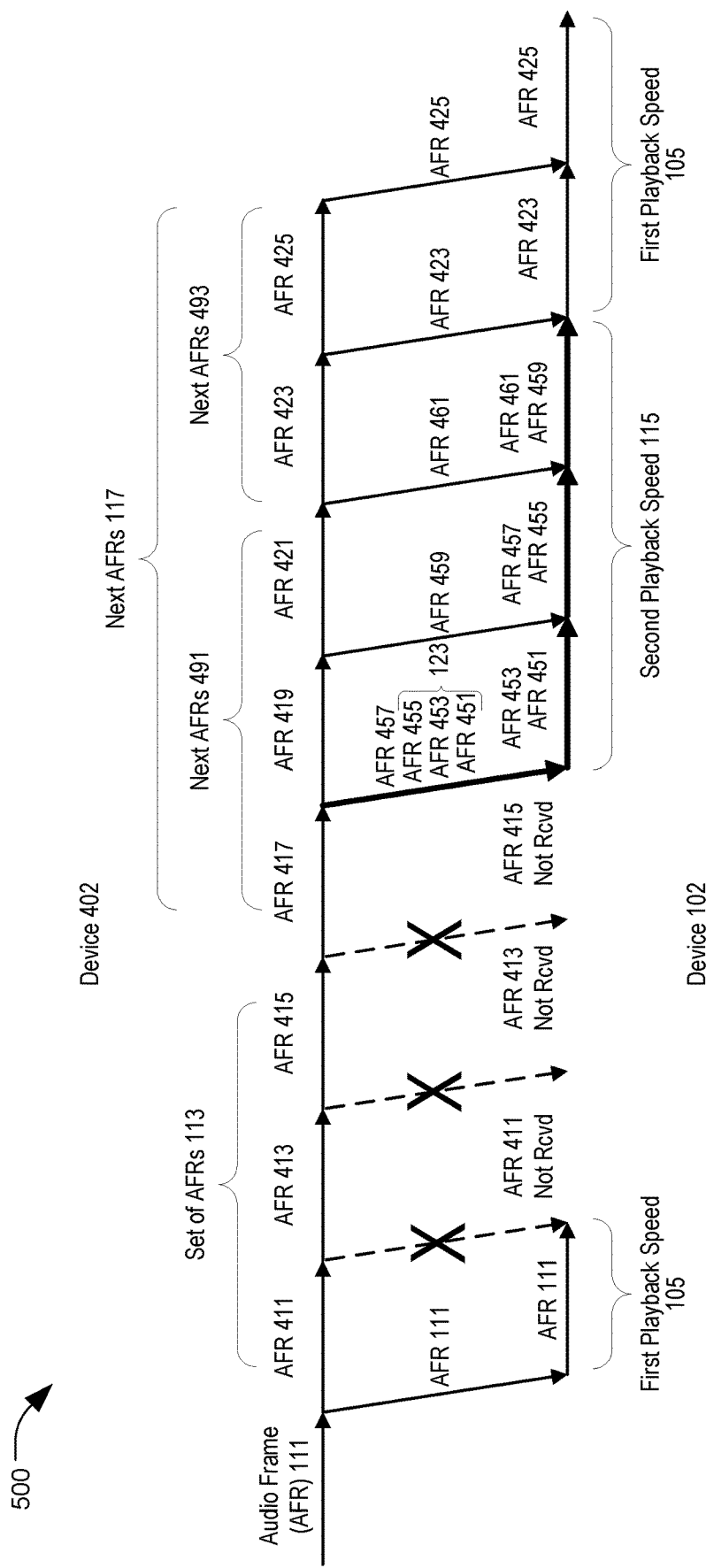
FIG. 5 is a diagram of an illustrative aspect of operation of components of any of the systems of FIGS. 1 to 3, in accordance with some examples of the present disclosure.

Referring to FIG. 5, a diagram is shown and generally designated 500. The diagram 500 indicates an illustrative aspect of operation of components of the system 100 of FIG. 1, the system 200 of FIG. 2, the system 300 of FIG. 3, or a combination thereof. The timing and operations shown in FIG. 5 are for illustration and are not limiting. In other aspects, additional or fewer operations may be performed and the timing may be different.

The device 402 generates the audio frame 111, the audio frame 411, the audio frame 413, the audio frame 415, the audio frame 417, the audio frame 419, the audio frame 421, the audio frame 423, the audio frame 425, one or more additional audio frames, or a combination thereof, of the sequence 119.

The device 402 transmits the audio frame 411 to the device 102. The device 102 plays out the audio frame 411 based on the first playback speed 105. The device 402 transmits each of the audio frame 413, the audio frame 415, and the audio frame 417. The device 102 does not receive any of the audio frame 413, the audio frame 415, or the audio frame 417.

The device 402 transmits the set of audio frames 123 (e.g., the audio frame 451, the audio frame 453, and the audio frame 455) concurrently with transmission of the next audio frames 117. For example, the device 402 generates the next audio frames 495 (e.g., the audio frame 457, the audio frame 459, and the audio frame 461) corresponding to the next audio frames 491 based on the second playback speed 115, as described with reference to FIG. 4. The device 402 initiates transmission of the next audio frames 495 and the next audio frames 493 at an expected time of initiating transmission of the next audio frames 117. For example, the device 402 transmits the audio frame 457, the audio frame 459, the audio frame 461, the audio frame 423, and the audio frame 425 at an expected transmission time of the corresponding audio frame 417, the corresponding audio frame 419, the corresponding audio frame 421, the audio frame 423, and the audio frame 425.

The device 102 plays out the set of audio frames 123 and the next audio frames 491 based on the second playback speed 115 (e.g., twice as fast as the first playback speed 105). For example, the device 102 plays out the audio frame 451 and the audio frame 453 at the second playback speed 115 in the same time it would have taken to play out a single audio frame at the first playback speed 105. Similarly, the device 102 plays out the audio frame 455 and the audio frame 457 at the second playback speed 115 in the same time it would have taken to play out a single audio frame at the first playback speed 105.

In a particular aspect, there is a gap in playout of the audio frame 111 and playout of the audio frame 451 at the device 102. Playing out the set of audio frames 123 and the next audio frames 491 enables catching up to the call so the next audio frames 493 can be played out at the first playback speed 105. For example, the device 102 plays out the audio frame 423 and the audio frame 425 at the first playback speed 105.

The next audio frames 491 are played out based on the second playback speed 115 to compensate for delay in initiating play out of the next audio frames 117 caused by playing out the set of audio frames 123. For example, the audio frame 451 and the audio frame 453 are played out at the time that audio frame 417 would have played out in normal conditions. To catch up to the call, if the second playback speed 115 is twice as fast as the first playback speed 105, the same number of additional audio frames (e.g., 3 additional audio frames) of the sequence 119 have to be played out based on the second playback speed 115 as the number of audio frames (e.g., 3 audio frames) that were lost. For example, if audio frames corresponding to a playback duration (e.g., 30 seconds) at the first playback speed 105 are lost, audio frames corresponding to the playback duration (e.g., 30 seconds) at the second playback speed 115 are played out to catch up to the call if the second playback speed 115 is twice as fast as the first playback speed 105. To illustrate, the first half of the playback duration (e.g., 15 seconds) is used to playout the missed audio frames based on the second playback speed 115 and the second half of the playback duration (e.g., 15 seconds) is used to playout the audio frames that would have been played during the playback duration (e.g., 30 seconds) at the first playback speed 105 under normal conditions. In a particular aspect, partial silence suppression can enable catching up faster or reducing the speed at which the audio frames have to be played to achieve the second playback speed 115 overall for the set of audio frames 123 or to achieve the second playback speed 115 as the effective playback speed overall for the set of audio frames 113.

Figure 6:
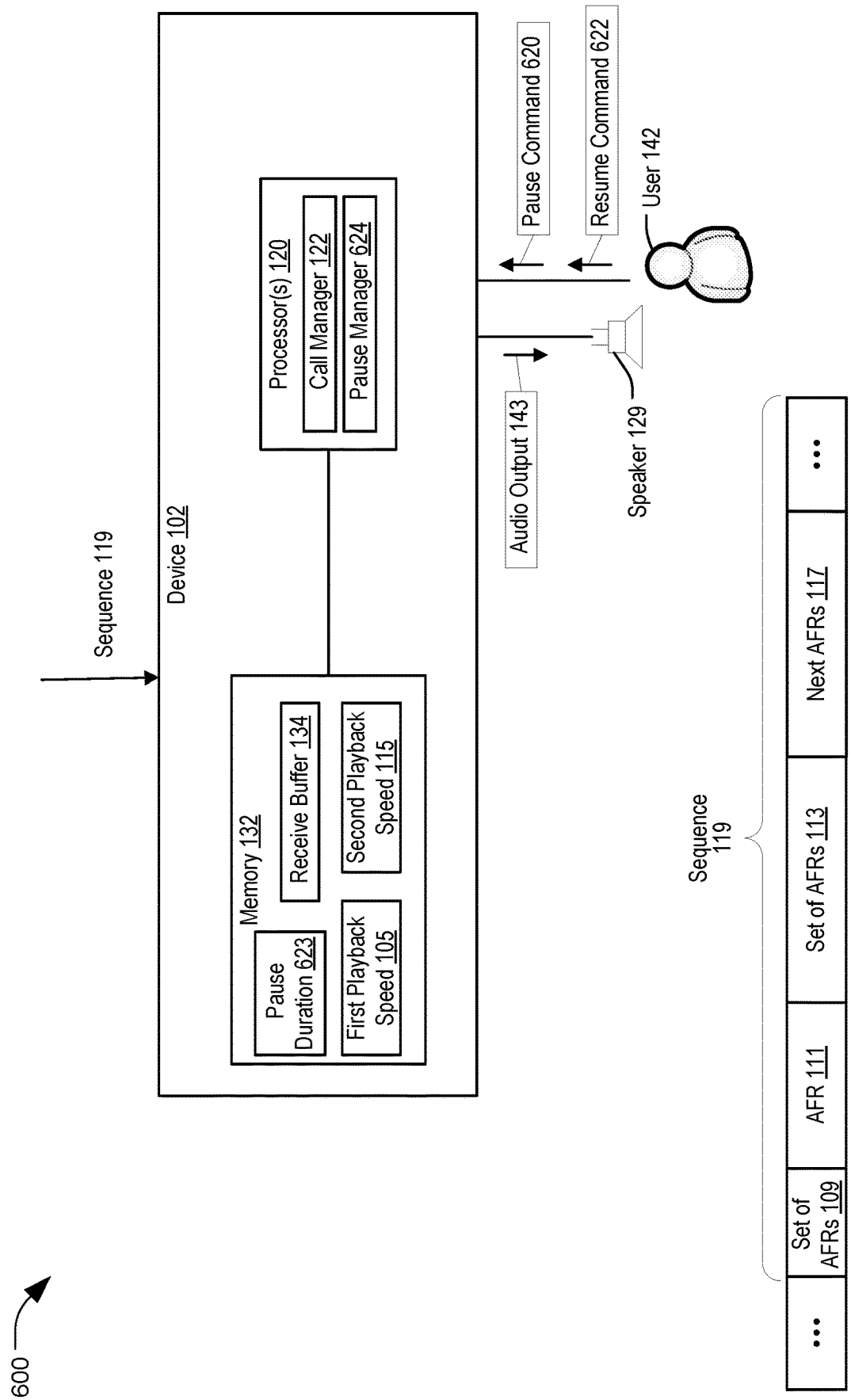
FIG. 6 is a diagram of an illustrative aspect of a system operable to adjust call audio playback speed, in accordance with some examples of the present disclosure.

Referring to FIG. 6, a system operable to adjust call audio playback speed is shown and generally designated 600. In a particular aspect, the system 100 of FIG. 1 includes one or more components of the system 600.

The one or more processors 120 include a pause manager 624. The device 102 receives the sequence 119 of audio frames during a call and stores audio frames of the sequence 119 in the receive buffer 134. In a particular aspect, the sequence 119 corresponds to audio frames received during a call with a single additional device, as described with reference to FIGS. 1-2. For example, the call is between no more than two devices, including the device 102 and the device 104. In an alternative aspect, the sequence 119 corresponds to audio frames received during a call with multiple second devices, as described with reference to FIG. 3. The call manager 122 retrieves audio frames from receive buffer 134 and plays them out via the speaker 129. For example, the call manager 122 generates the audio output 143 based on the retrieved audio frames and provides the audio output 143 to the speaker 129. To illustrate, the call manager 122 plays out the set of audio frames 109, the audio frame 111, or a combination thereof, at the first playback speed 105.

The device 102 receives a pause command 620 (e.g., via a user input) from the user 142. The pause command 620 indicates a user request to pause playback of the call. The pause manager 624, in response to receiving the pause command 620, stops playout of audio frames of the sequence 119. For example, the pause manager 624 receives the pause command 620 subsequent to playout, by the call manager 122, of the audio frame 111 at a playback time. The pause manager 624 stops the call manager 122 from playing out subsequent audio frames of the sequence 119. In a particular implementation, the pause manager 624 marks audio frames (e.g., the set of audio frames 113) subsequent to the audio frame 111 that are stored in the receive buffer 134 as unavailable for playback.

The pause manager 624 receives, at a resume time, a resume command 622 (e.g., via a user input) from the user 142. The resume command 622 indicates a user request to resume playback of the call. In a particular aspect, the pause manager 624 identifies the set of audio frames 113 as the previous audio frames that have missed playback. For example, the pause manager 624 determines that the set of audio frames 113 would have been played out during a pause duration 623 between the playback time of the last played audio frame (e.g., the audio frame 111) and the resume time.

In a particular aspect, the pause manager 624 performs one or more operations described with reference to the frame loss manager 156, the frame loss manager 124 of FIG. 1, or both. For example, the pause manager 624 generates the set of audio frames 123 based on the set of audio frames 113, as described with reference to FIG. 1. In a particular implementation, the set of audio frames 123 includes the same audio frames as the set of audio frames 113 and the pause manager 624 plays out the set of audio frames 123 (e.g., the set of audio frames 113) at the second playback speed 115. In another implementation, the set of audio frames 123 includes a subset of the set of audio frames 113 so that playout of the set of audio frames 123 at the first playback speed 105 corresponds to an effective playback speed (e.g., the second playback speed 115) of the set of audio frames 113. The pause manager 624 transitions the next audio frames 117 from the second playback speed 115 to the first playback speed 105, as described with reference to FIG. 1.

In a particular example, the pause manager 624 performs at least partial silence suppression in the set of audio frames 123, a subset of the next audio frames 117, or both, as described with reference to FIG. 1. In a particular aspect, the pause manager 624 determines the second playback speed 115 based on a count of audio frames in the receive buffer 134 available for playback. In a particular aspect, the pause manager 624 determines the second playback speed 115 based on the pause duration 623. For example, a longer pause duration 623 corresponds to a higher second playback speed 115. In a particular implementation, the pause manager 624 selectively generates the set of audio frames 123 based on the set of audio frames 113, as described with reference to FIG. 1. For example, the pause manager 624 generates the set of audio frames 123 for playback based on the second playback speed 115 (e.g., an actual playback speed or an effective playback speed) or skips ahead to playback of the next audio frames 117 at the first playback speed 105.

The system 600 thus enables the user 142 to pause a call (e.g., a real-time call). The user 142 can resume the call and catch up to the conversation without having to ask other participants to repeat what was missed.

Figure 7:
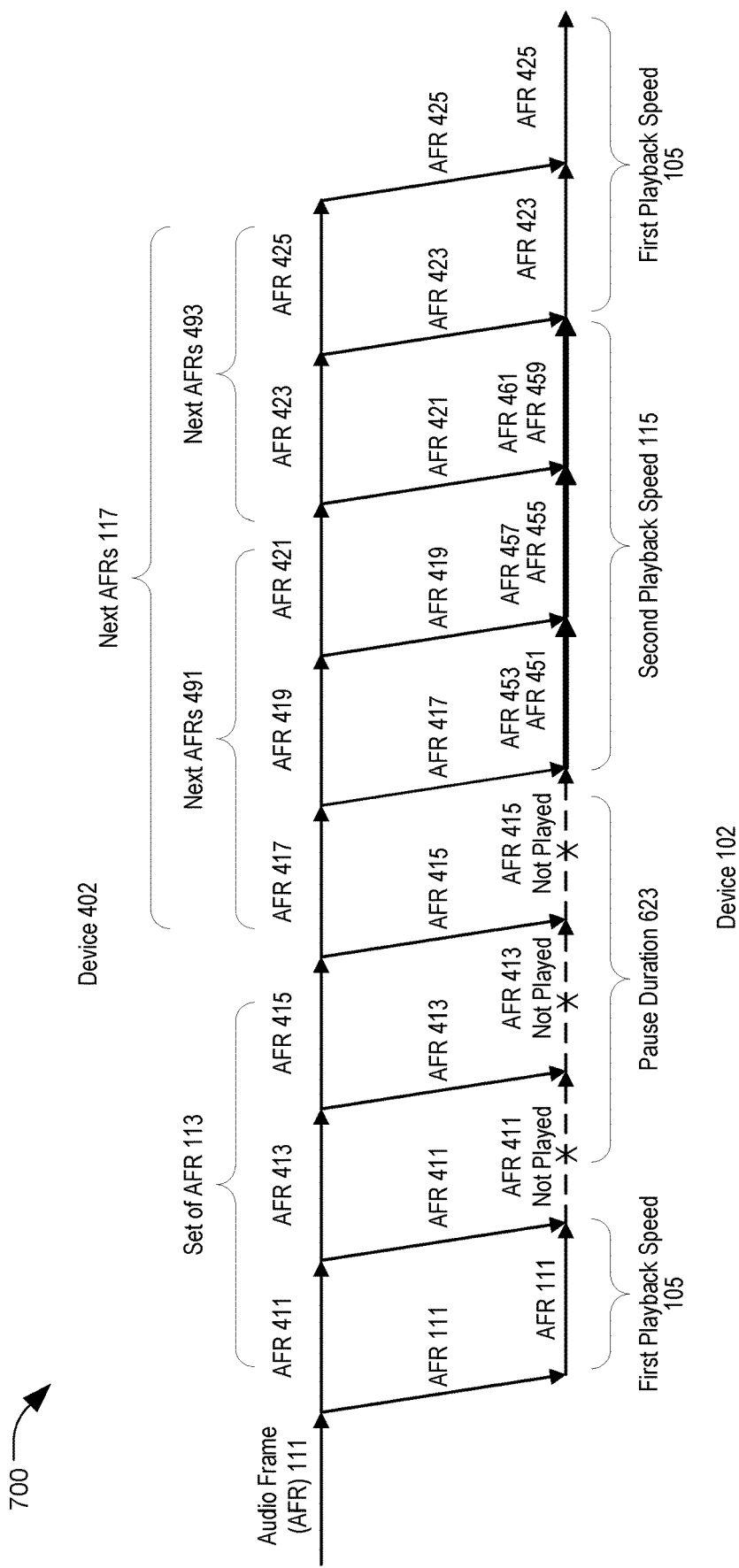
FIG. 7 is a diagram of an illustrative aspect of operation of components of the system of FIG. 6, in accordance with some examples of the present disclosure.

Referring to FIG. 7, a diagram is shown and generally designated 700. The diagram 700 indicates an illustrative aspect of operation of components of the system 600 of FIG. 6. The timing and operations shown in FIG. 7 are for illustration and are not limiting. In other aspects, additional or fewer operations may be performed and the timing may be different.

During a call, the device 102 receives the audio frame 111, the audio frame 411, the audio frame 413, the audio frame 415, the audio frame 417, the audio frame 419, the audio frame 421, the audio frame 423, the audio frame 425, one or more additional audio frames of the sequence 119, or a combination thereof, from the device 402.

The device 102 (e.g., the call manager 122) plays out the audio frame 111 at the first playback speed 105. The device 102 receives the pause command 620 and pauses playback of the call during the pause duration 623, as described with reference to FIG. 6. For example, the device 102 refrains from playing out the audio frame 411, the audio frame 413, and the audio frame 415 that would have been played out during the pause duration 623 at the first playback speed 105 during normal operation.

The device 102 receives the resume command 622 and resumes playback of the call, as described with reference to FIG. 6. For example, the device 102 (e.g., the pause manager 624) generates the set of audio frames 123 (e.g., the audio frame 451, the audio frame 453, and the audio frame 455) from the set of audio frames 113 and plays out the set of audio frames 123 based on the second playback speed 115, as described with reference to FIG. 5.

The pause manager 624 transitions from the second playback speed 115 to the first playback speed 105 for the next audio frames 117. For example, the pause manager 624 generates the next audio frames 495 corresponding to the next audio frames 491 based on the second playback speed 115, as described with reference to FIG. 4. For example, the next audio frames 495 are the same as the next audio frames 491 and are played out at the second playback speed 115 or the next audio frames 495 are a subset of the next audio frames 491 such that playing out the next audio frames 495 at the first playback speed 105 corresponds to an effective playback speed (e.g., the second playback speed 115) of the next audio frames 491, as described with reference to FIG. 5. The pause manager 624 transitions from the second playback speed 115 to the first playback speed 105 by playing out the next audio frames 493 based on the first playback speed 105. For example, the pause manager 624 plays out the audio frame 423 and the audio frame 425 at the first playback speed 105.

Figure 8:
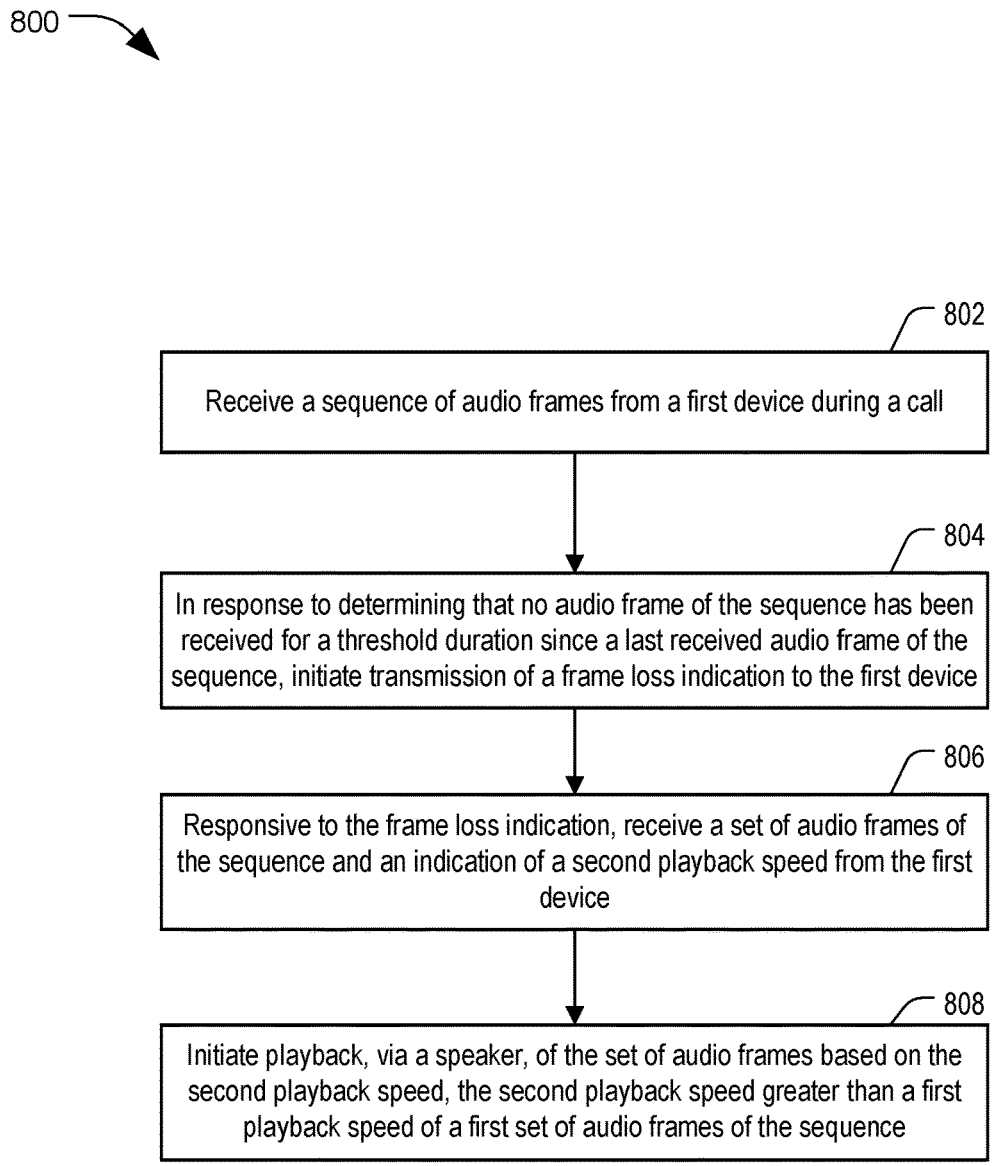
FIG. 8 is a diagram of a particular implementation of a method of call audio playback speed adjustment that may be performed by a device of FIGS. 1-3, in accordance with some examples of the present disclosure.

Referring to FIG. 8, a particular implementation of a method 800 of call audio playback speed adjustment is shown. In a particular aspect, one or more operations of the method 800 are performed by at least one of the frame loss manager 124, the call manager 122, the one or more processors 120, the device 102, the system 100 of FIG. 1, the system 200 of FIG. 2, the system 300 of FIG. 3, or a combination thereof.

The method 800 includes receiving a sequence of audio frames from a first device during a call, at 802. For example, the device 102 receives the sequence 119 of audio frames from the device 104 during a call, as described with reference to FIG. 1.

The method 800 also includes, in response to determining that no audio frame of the sequence has been received for a threshold duration since a last received audio frame of the sequence, initiating transmission of a frame loss indication to the first device, at 804. For example, the frame loss manager 124 of FIG. 1, in response to determining that no audio frame of the sequence 119 has been received for a threshold duration since a last received frame (e.g., the audio frame 111) of the sequence 119, initiates transmission of the frame loss indication 121 to the device 104, as described with reference to FIG. 1.

The method 800 further includes, responsive to the frame loss indication, receiving a set of audio frames of the sequence and an indication of a second playback speed from the first device, at 806. For example, the device 102 of FIG. 1, responsive to the frame loss indication 121, receives the set of audio frames 123 of the sequence 119 and an indication of the second playback speed 115 from the device 104, as described with reference to FIG. 1.

The method 800 also includes initiating playback, via a speaker, of the set of audio frames based on the second playback speed, at 808. For example, the frame loss manager 124 initiates playback, via the speaker 129, of the set of audio frames 123 at based on the second playback speed 115, as described with reference to FIG. 1. The second playback speed 115 is greater than the first playback speed 105 of the set of audio frames 109 of the sequence 119. The method 800 thus enables receiving previously lost audio frames and catching up to a call by playing out audio frames at a faster playback speed.

The method 800 of FIG. 8 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 800 of FIG. 8 may be performed by one or more processors that execute instructions, such as described with reference to FIG. 21.

Figure 9:
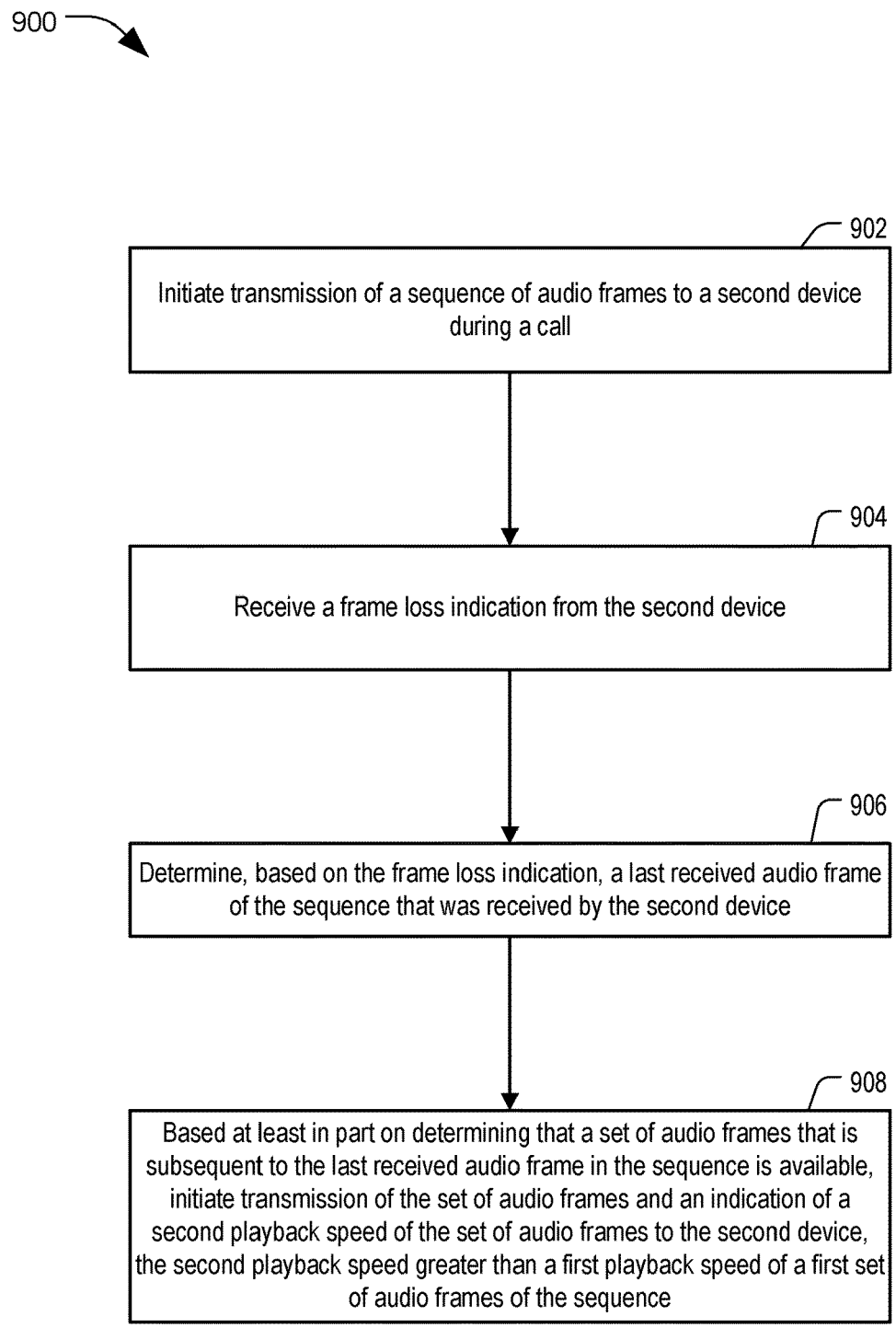
FIG. 9 is a diagram of a particular implementation of a method of call audio playback speed adjustment that may be performed by a device of FIGS. 1-3, in accordance with some examples of the present disclosure.

Referring to FIG. 9, a particular implementation of a method 900 of call audio playback speed adjustment is shown. In a particular aspect, one or more operations of the method 900 are performed by at least one of the frame loss manager 156, the call manager 152, the one or more processors 150, the device 104, the system 100 of FIG. 1, the system 200 of FIG. 2, the system 300 of FIG. 3, or a combination thereof.

The method 900 includes initiating transmission of a sequence of audio frames to a second device during a call, at 902. For example, the device 104 of FIG. 1 initiates transmission of the sequence 119 of audio frames to the device 102 during a call, as described with reference to FIG. 1.

The method 900 also includes receiving a frame loss indication from the second device, at 904. For example, the frame loss manager 156 of FIG. 1 receives the frame loss indication 121 from the device 102, as described with reference to FIG. 1.

The method 900 further includes determining, based on the frame loss indication, a last received audio frame of the sequence that was received by the second device, at 906. For example, the frame loss manager 156 of FIG. 1 determines, based on the frame loss indication 121, a last received audio frame (e.g., the audio frame 111) of the sequence 119 that was received by the device 102, as described with reference to FIG. 1.

The method 900 also includes, based at least in part on determining that a set of audio frames that is subsequent to the last received audio frame in the sequence is available, initiating transmission of the set of audio frames and an indication of a second playback speed of the set of audio frames to the second device, at 908. For example, the frame loss manager 156, based at least in part on determining that the set of audio frames 113 that is subsequent to the audio frame 111 is available, initiates transmission of the set of audio frames 113 (e.g., the set of audio frames 123 is the same as the set of audio frames 113) and an indication of the second playback speed 115, as described with reference to FIG. 1. The second playback speed 115 is greater than the first playback speed 105 of the set of audio frames 109 of the sequence 119. The method 900 thus enables retransmitting previously lost audio frames and enabling the device 102 to catch up to a call by playing out audio frames at a faster playback speed.

The method 900 of FIG. 9 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 900 of FIG. 9 may be performed by one or more processors that execute instructions, such as described with reference to FIG. 21.

Figure 10:
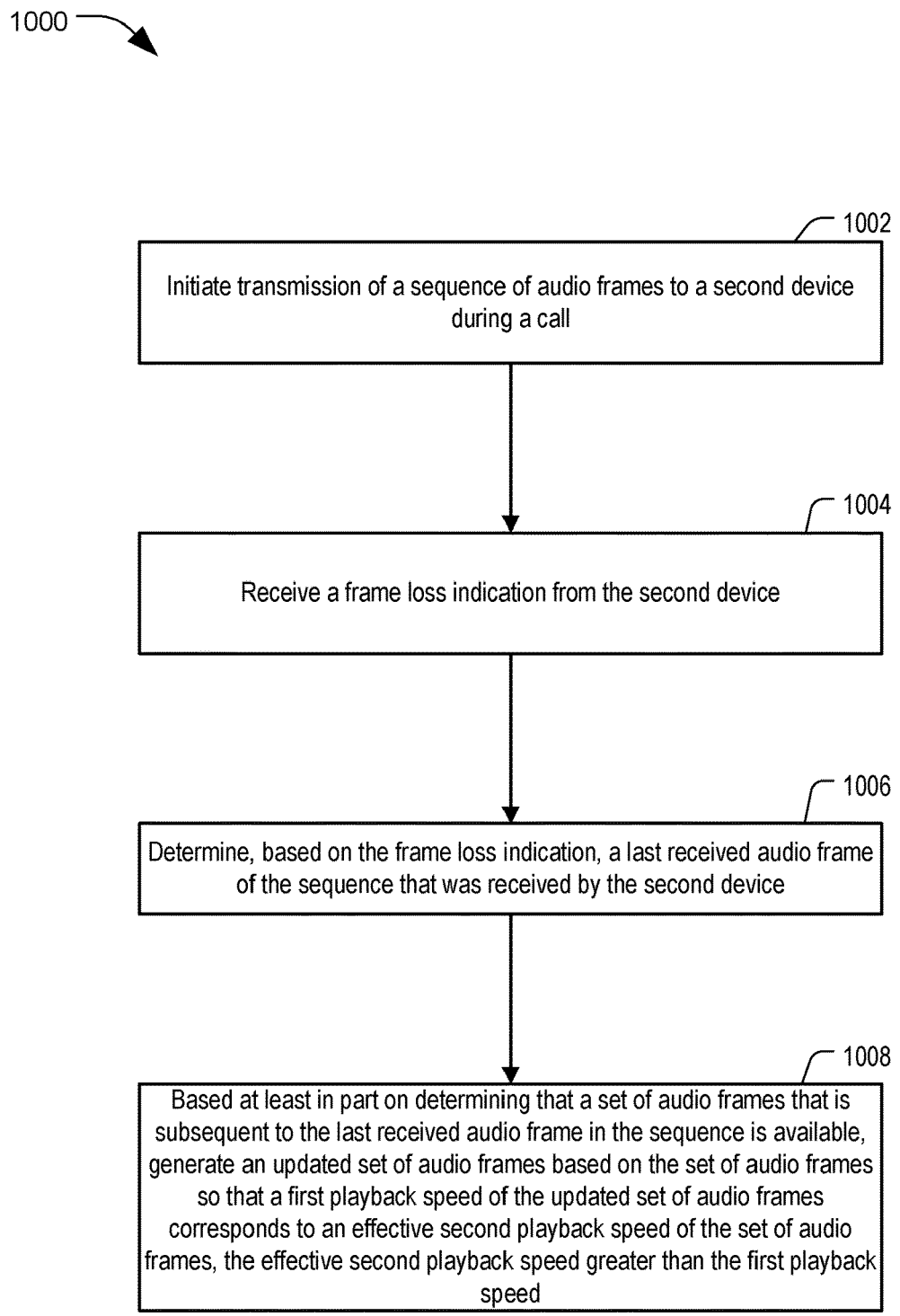
FIG. 10 is a diagram of a particular implementation of a method of call audio playback speed adjustment that may be performed by a device of FIGS. 1-3, in accordance with some examples of the present disclosure.

Referring to FIG. 10, a particular implementation of a method 1000 of call audio playback speed adjustment is shown. In a particular aspect, one or more operations of the method 1000 are performed by at least one of the frame loss manager 156, the call manager 152, the one or more processors 150, the device 104, the system 100 of FIG. 1, the system 200 of FIG. 2, the system 300 of FIG. 3, or a combination thereof.

The method 1000 includes initiating transmission of a sequence of audio frames to a second device during a call, at 1002. For example, the device 104 of FIG. 1 initiates transmission of the sequence 119 of audio frames to the device 102 during a call, as described with reference to FIG. 1.

The method 1000 also includes receiving a frame loss indication from the second device, at 1004. For example, the frame loss manager 156 of FIG. 1 receives the frame loss indication 121 from the device 102, as described with reference to FIG. 1.

The method 1000 further includes determining, based on the frame loss indication, a last received audio frame of the sequence that was received by the second device, at 1006. For example, the frame loss manager 156 of FIG. 1 determines, based on the frame loss indication 121, a last received audio frame (e.g., the audio frame 111) of the sequence 119 that was received by the device 102, as described with reference to FIG. 1.

The method 1000 also includes, based at least in part on determining that a set of audio frames that is subsequent to the last received audio frame in the sequence is available, generating an updated set of audio frames based on the set of audio frames so that a first playback speed of the updated set of audio frames corresponds to an effective second playback speed of the set of audio frames, at 1008. For example, the frame loss manager 156, based at least in part on determining that the set of audio frames 113 that is subsequent to the audio frame 111 is available, generates the set of audio frames 123 based on a subset of the set of audio frames 113 so that the first playback speed 105 of the set of audio frames 123 corresponds to an effective playback speed (e.g., the second playback speed 115) of the set of audio frames 113, as described with reference to FIG. 1. The effective second playback speed (e.g., the second playback speed 115) is greater than the first playback speed 105. The method 1000 thus enables transmission of audio frames corresponding to lost audio frames that have a faster effective playback speed to catch up to a call.

The method 1000 of FIG. 10 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1000 of FIG. 10 may be performed by one or more processors that execute instructions, such as described with reference to FIG. 21.

Figure 11:
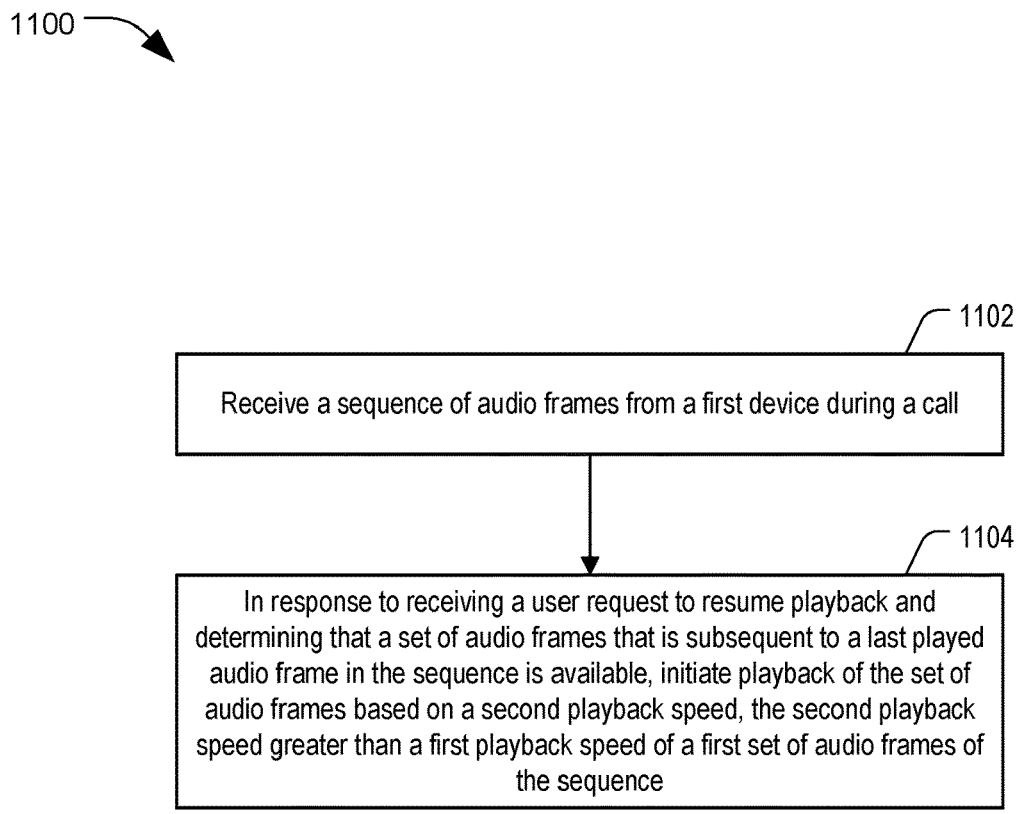
FIG. 11 is a diagram of a particular implementation of a method of call audio playback speed adjustment that may be performed by a device of FIG. 6, in accordance with some examples of the present disclosure.

Referring to FIG. 11, a particular implementation of a method 1100 of call audio playback speed adjustment is shown. In a particular aspect, one or more operations of the method 1100 are performed by at least one of the frame loss manager 124, the call manager 122, the one or more processors 120, the device 102, the system 100 of FIG. 1, the pause manager 624, the system 600 of FIG. 6, or a combination thereof.

The method 1100 includes receiving a sequence of audio frames from a first device during a call, at 1102. For example, the device 102 receives the sequence 119 of audio frames from the device 104 during a call, as described with reference to FIG. 1.

The method 1100 also includes, in response to receiving a user request to resume playback and determining that a set of audio frames that is subsequent to a last played audio frame in the sequence is available, initiating playback of the set of audio frames based on a second playback speed, at 1104. For example, the pause manager 624 of FIG. 6, in response to receiving the resume command 622 indicating a user request to resume playback and determining that the set of audio frames 113 that is subsequent to a last played audio frame (e.g., the audio frame 111) is available, initiates playback of the set of audio frames 113 based on the second playback speed 115, as described with reference to FIG. 6. The second playback speed 115 is greater than a first playback speed 105 of the set of audio frames 109 of the sequence 119.

The method 1100 thus enables a user to pause a call (e.g., a real-time call). The user can resume the call and catch up to the conversation without having to ask other participants to repeat what was missed.

The method 1100 of FIG. 11 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1100 of FIG. 11 may be performed by one or more processors that execute instructions, such as described with reference to FIG. 21.

Figure 12:
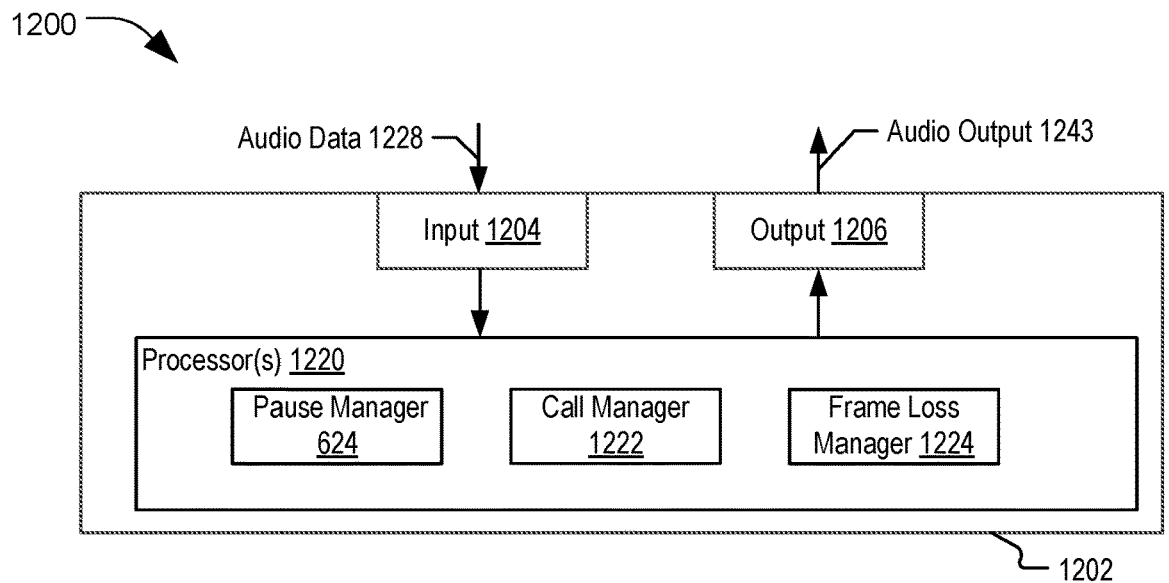
FIG. 12 illustrates an example of an integrated circuit operable to adjust call audio playback speed, in accordance with some examples of the present disclosure.

FIG. 12 depicts an implementation 1200 of the device 102, the device 104 of FIG. 1, the server 204 of FIG. 2, or a combination thereof, as an integrated circuit 1202 that includes one or more processors 1220. The one or more processors 1220 include a call manager 1222, a frame loss manager 1224, the pause manager 624, or a combination thereof.

In a particular aspect, the call manager 1222 corresponds to the call manager 122, the call manager 152 of FIG. 1, the call manager 222 of FIG. 2, or a combination thereof. In a particular aspect, the frame loss manager 1224 corresponds to the frame loss manager 124, the frame loss manager 156 of FIG. 1, the frame loss manager 224 of FIG. 2, or a combination thereof.

Figure 16:
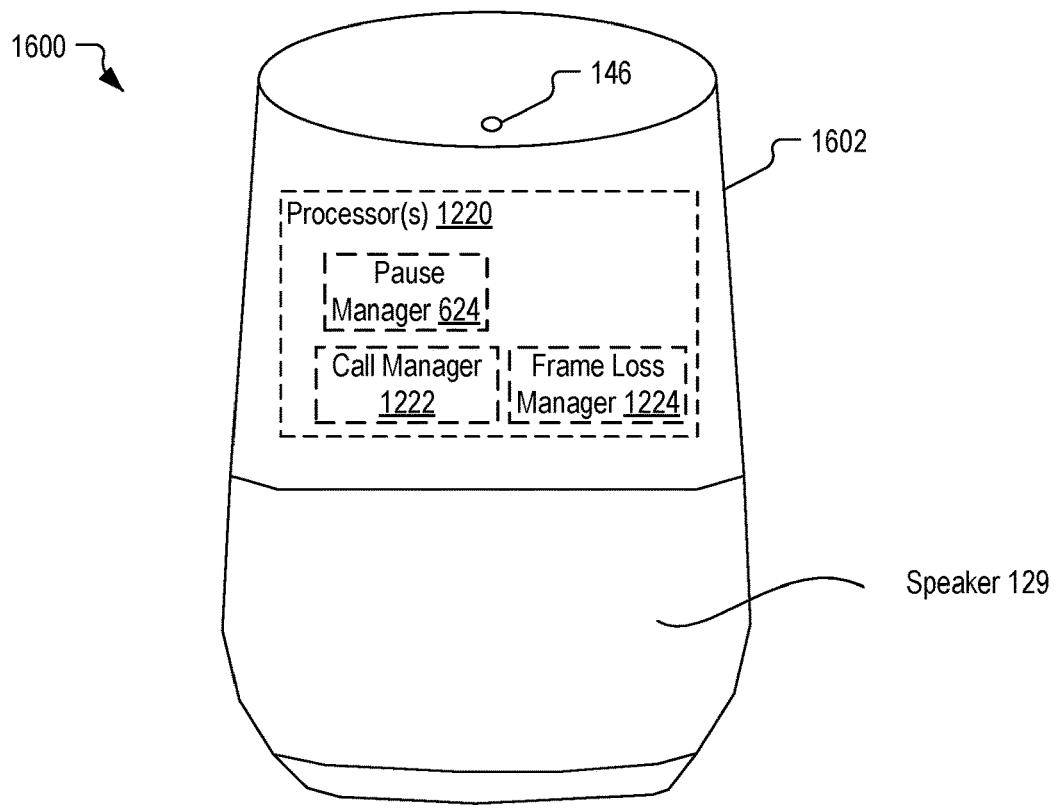
FIG. 16 is a diagram of a voice-controlled speaker system operable to adjust call audio playback speed, in accordance with some examples of the present disclosure.
Figure 17:
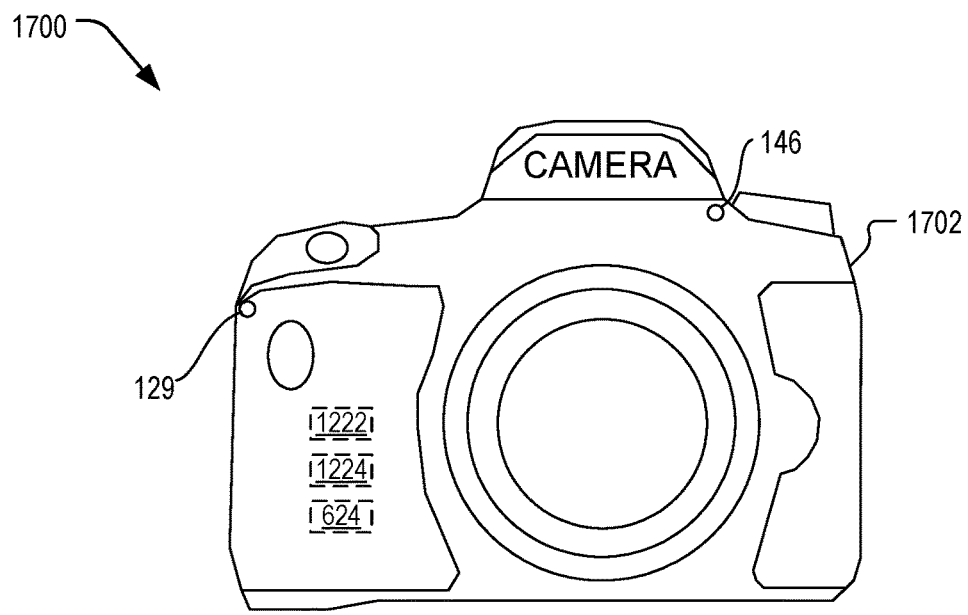
FIG. 17 is a diagram of a camera operable to adjust call audio playback speed, in accordance with some examples of the present disclosure.
Figure 18:
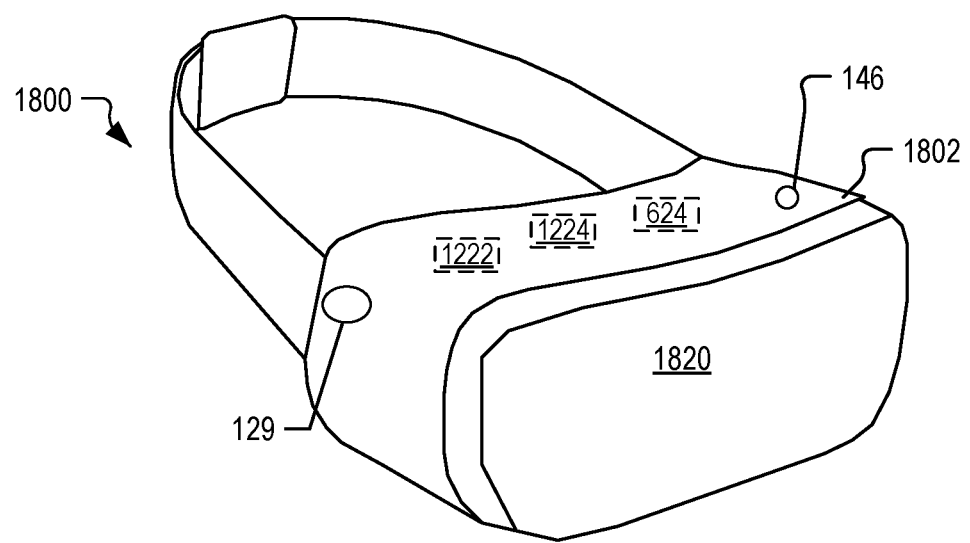
FIG. 18 is a diagram of a headset, such as a virtual reality or augmented reality headset, operable to adjust call audio playback speed, in accordance with some examples of the present disclosure.
Figure 19:
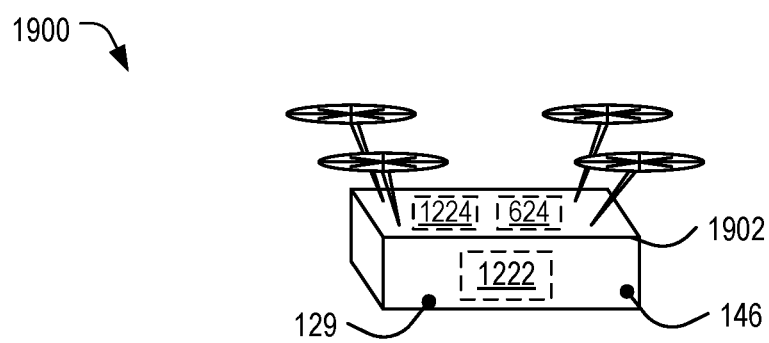
FIG. 19 is a diagram of a first example of a vehicle operable to adjust call audio playback speed, in accordance with some examples of the present disclosure.
Figure 20:
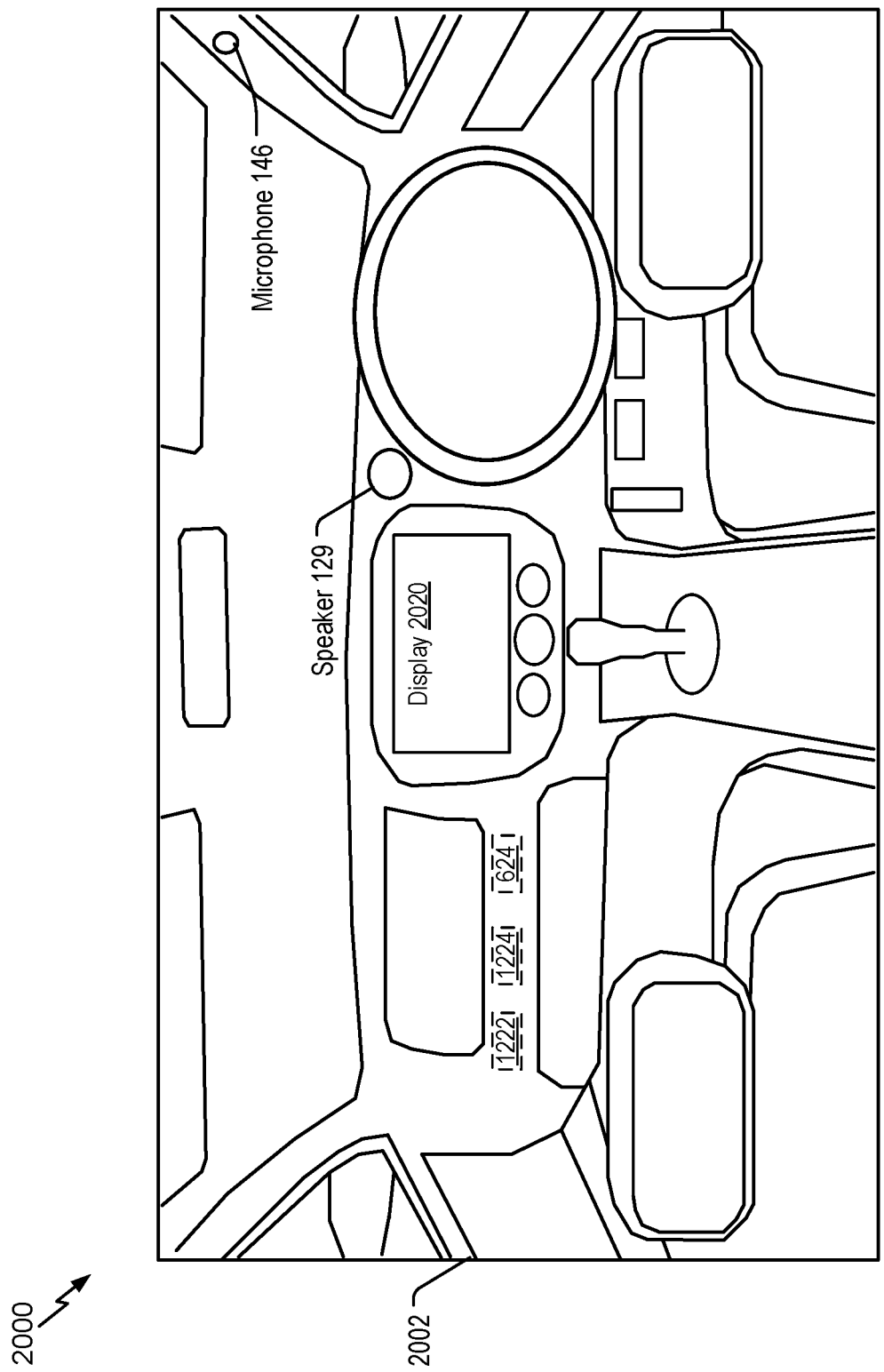
FIG. 20 is a diagram of a second example of a vehicle operable to adjust call audio playback speed, in accordance with some examples of the present disclosure.

The integrated circuit 1202 also includes an audio input 1204, such as one or more bus interfaces, to enable the audio data 1228 (e.g., the audio input 141) to be received for processing. The integrated circuit 1202 also includes an audio output 1206, such as a bus interface, to enable sending of an audio output 1243, such as the audio output 143. The integrated circuit 1202 enables implementation of call audio playback speed adjustment as a component in a system, such as a mobile phone or tablet as depicted in FIG. 13, a headset as depicted in FIG. 14, a wearable electronic device as depicted in FIG. 15, a voice-controlled speaker system as depicted in FIG. 16, a camera as depicted in FIG. 17, a virtual reality headset or an augmented reality headset as depicted in FIG. 18, or a vehicle as depicted in FIG. 19 or FIG. 20.

Figure 13:
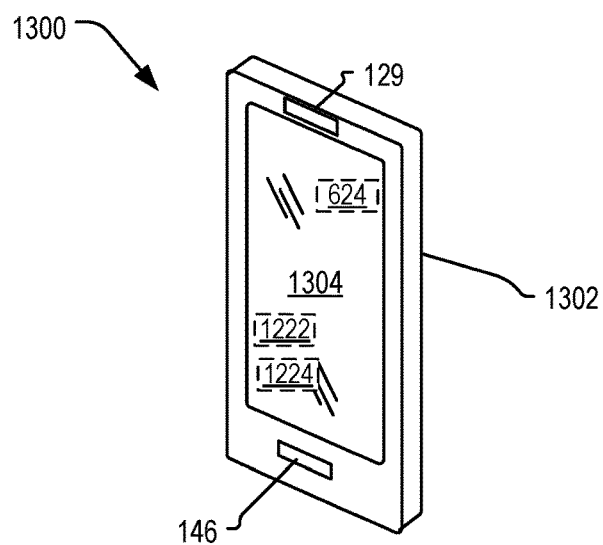
FIG. 13 is a diagram of a mobile device operable to adjust call audio playback speed, in accordance with some examples of the present disclosure.

FIG. 13 depicts an implementation 1300 in which the device 102, the device 104, the server 204, or a combination thereof, includes a mobile device 1302, such as a phone or tablet, as illustrative, non-limiting examples. The mobile device 1302 includes the speaker 129, the microphone 146, and a display screen 1304. Components of the processor 1220, including the call manager 1222, the frame loss manager 1224, the pause manager 624, or a combination thereof, are integrated in the mobile device 1302 and are illustrated using dashed lines to indicate internal components that are not generally visible to a user of the mobile device 1302. In a particular example, the frame loss manager 1224, the pause manager 624, the call manager 1222, or a combination thereof, operate to adjust call audio playback speed of user speech, which is then processed to perform one or more operations at the mobile device 1302, such as display information associated with the user's speech at the display screen 1304 (e.g., via an integrated "smart assistant" application).

Figure 14:
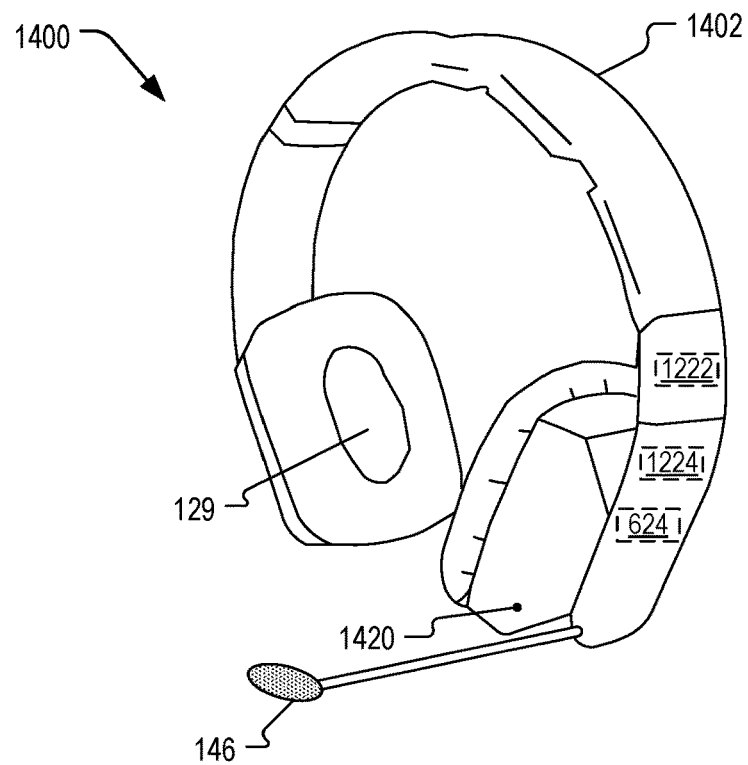
FIG. 14 is a diagram of a headset operable to adjust call audio playback speed, in accordance with some examples of the present disclosure.

FIG. 14 depicts an implementation 1400 in which the device 102, the device 104, the server 204, or a combination thereof, includes a headset device 1402. The headset device 1402 includes the speaker 129, the microphone 146, or both. Components of the one or more processors 1220, including the frame loss manager 1224, the pause manager 624, the call manager 1222, or a combination thereof, are integrated in the headset device 1402. In a particular example, the frame loss manager 1224, the pause manager 624, the call manager 1222, or a combination thereof, operate to adjust call audio playback speed of user speech, which may cause the headset device 1402 to perform one or more operations at the headset device 1402, to transmit audio data corresponding to user voice activity to a second device (not shown), for further processing, or a combination thereof.

Figure 15:
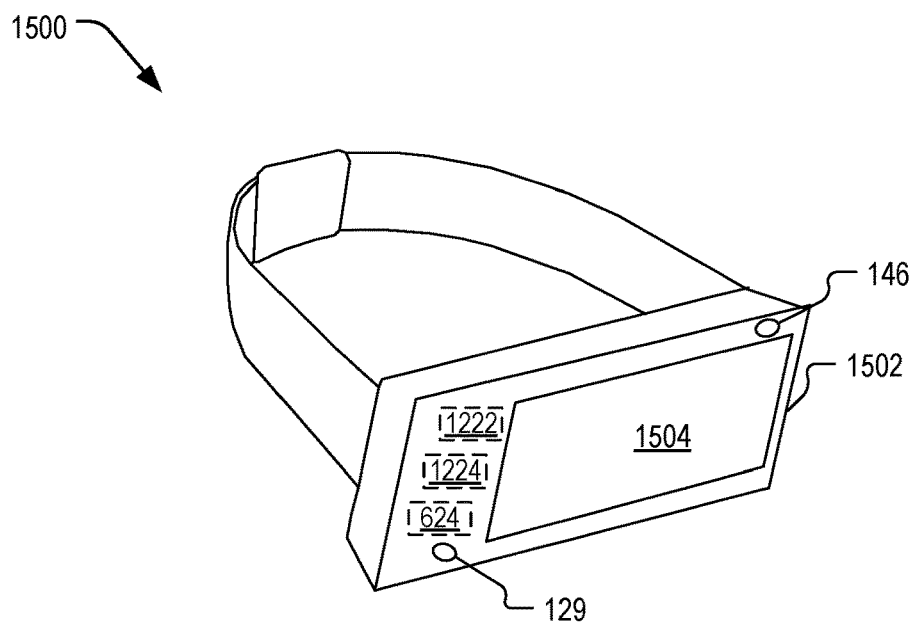
FIG. 15 is a diagram of a wearable electronic device operable to adjust call audio playback speed, in accordance with some examples of the present disclosure.

FIG. 15 depicts an implementation 1500 in which the device 102, the device 104, the server 204, or a combination thereof, includes a wearable electronic device 1502, illustrated as a "smart watch." The frame loss manager 1224, the pause manager 624, the call manager 1222, the microphone 146, the speaker 129, or a combination thereof, are integrated into the wearable electronic device 1502. In a particular example, the frame loss manager 1224, the pause manager 624, the call manager 1222, or a combination thereof, operate to adjust call audio playback speed of user speech, which is then processed to perform one or more operations at the wearable electronic device 1502, such as to launch a graphical user interface or otherwise display other information associated with the user's speech at a display screen 1504 of the wearable electronic device 1502. To illustrate, the wearable electronic device 1502 may include a display screen that is configured to display a notification based on user speech detected by the wearable electronic device 1502. In a particular example, the wearable electronic device 1502 includes a haptic device that provides a haptic notification (e.g., vibrates) in response to detection of user voice activity. For example, the haptic notification can cause a user to look at the wearable electronic device 1502 to see a displayed notification indicating detection of a keyword spoken by the user (e.g., to pause or resume playback of call), or an alert indicating that call audio is being played in a catch up mode (e.g., increased speed). The wearable electronic device 1502 can thus alert a user with a hearing impairment or a user wearing a headset that the user's voice activity is detected.

FIG. 16 is an implementation 1600 in which the device 102, the device 104, the server 204, or a combination thereof, includes a wireless speaker and voice activated device 1602. The wireless speaker and voice activated device 1602 can have wireless network connectivity and is configured to execute an assistant operation. The one or more processors 1220 including the frame loss manager 1224, the pause manager 624, the call manager 1222, the microphone 146, the speaker 129, or a combination thereof, are included in the wireless speaker and voice activated device 1602. In a particular example, the frame loss manager 1224, the pause manager 624, the call manager 1222, or a combination thereof, operate to adjust call audio playback speed of user speech. During operation, in response to receiving a verbal command identified as user speech, the wireless speaker and voice activated device 1602 can execute assistant operations, such as via execution of a voice activation system (e.g., an integrated assistant application). The assistant operations can include pausing a call, resuming a paused call with an increased playback speed to catch up, adjusting a temperature, playing music, turning on lights, etc. For example, the assistant operations are performed responsive to receiving a command after a keyword or key phrase (e.g., "hello assistant").

FIG. 17 depicts an implementation 1700 in which the device 102, the device 104, the server 204, or a combination thereof, includes a portable electronic device that corresponds to a camera device 1702. The frame loss manager 1224, the pause manager 624, the call manager 1222, the microphone 146, the speaker 129, or a combination thereof, are included in the camera device 1702. In a particular example, the frame loss manager 1224, the pause manager 624, the call manager 1222, or a combination thereof, operate to adjust call audio playback speed of user speech. During operation, in response to receiving a verbal command identified as user speech, the camera device 1702 can execute operations responsive to spoken user commands, such as to adjust image or video capture settings, image or video playback settings, or image or video capture instructions, as illustrative examples.

FIG. 18 depicts an implementation 1800 in which the device 102, the device 104, the server 204, or a combination thereof, includes a portable electronic device that corresponds to a virtual reality, augmented reality, or mixed reality headset 1802. The frame loss manager 1224, the pause manager 624, the call manager 1222, the microphone 146, the speaker 129, or a combination thereof, are integrated into the headset 1802. In a particular example, the frame loss manager 1224, the pause manager 624, the call manager 1222, or a combination thereof, operate to adjust call audio playback speed of user speech. A visual interface device 1820 is positioned in front of the user's eyes to enable display of augmented reality or virtual reality images or scenes to the user while the headset 1802 is worn. In a particular example, the visual interface device is configured to display a notification indicating detected user speech.

FIG. 19 depicts an implementation 1900 in which the device 102, the device 104, the server 204, or a combination thereof, corresponds to, or is integrated within, a vehicle 1902, illustrated as a manned or unmanned aerial device (e.g., a package delivery drone). The frame loss manager 1224, the pause manager 624, the call manager 1222, the microphone 146, the speaker 129, or a combination thereof, are integrated into the vehicle 1902. In a particular example, the frame loss manager 1224, the pause manager 624, the call manager 1222, or a combination thereof, operate to adjust call audio playback speed of user speech, such as for delivery instructions from an authorized user of the vehicle 1902.

FIG. 20 depicts another implementation 2000 in which the device 102, the device 104, the server 204, or a combination thereof, corresponds to, or is integrated within, a vehicle 2002, illustrated as a car. The vehicle 2002 includes the one or more processor 1220 including the frame loss manager 1224, the pause manager 624, the call manager 1222, or a combination thereof. The vehicle 2002 also includes the microphone 146, the speaker 129, or both. In a particular example, the frame loss manager 1224, the pause manager 624, the call manager 1222, or a combination thereof, operate to adjust call audio playback speed of user speech, such as for a voice command from an authorized passenger. In a particular implementation, in response to receiving a verbal command identified as user speech, a voice activation system initiates one or more operations of the vehicle 2002 based on one or more keywords (e.g., "unlock," "start engine," "play music," "display weather forecast," or another voice command), such as by providing feedback or information via a display 2020 or one or more speakers (e.g., the speaker 129).

Figure 21:
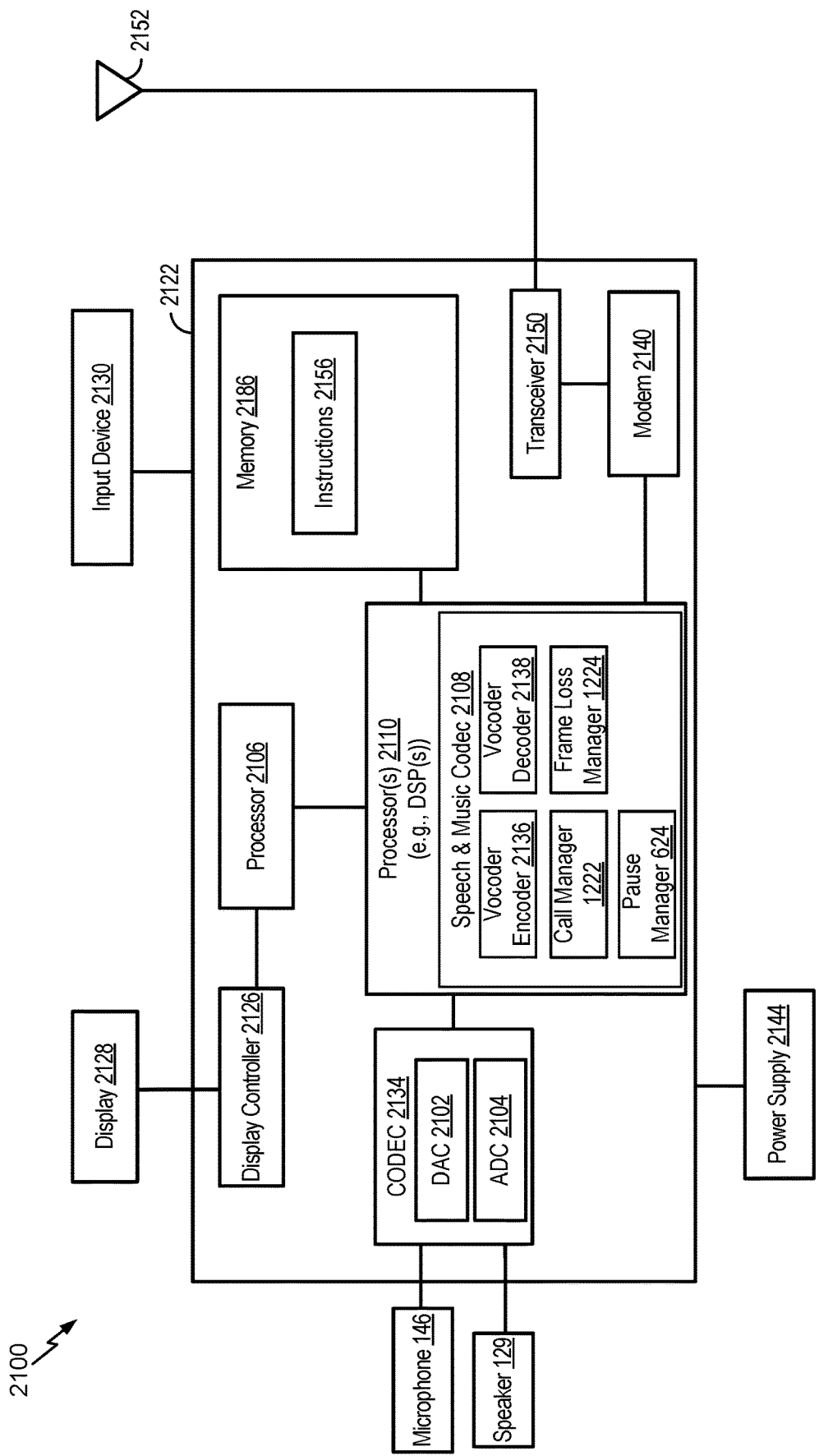
FIG. 21 is a block diagram of a particular illustrative example of a device that is operable to adjust call audio playback speed, in accordance with some examples of the present disclosure.

Referring to FIG. 21, a block diagram of a particular illustrative implementation of a device is depicted and generally designated 2100. In various implementations, the device 2100 may have more or fewer components than illustrated in FIG. 21. In an illustrative implementation, the device 2100 may correspond to the device 102, the device 104, the server 204, or a combination thereof. In an illustrative implementation, the device 2100 may perform one or more operations described with reference to FIGS. 1-20.

In a particular implementation, the device 2100 includes a processor 2106 (e.g., a central processing unit (CPU)). The device 2100 may include one or more additional processors 2110 (e.g., one or more DSPs). In a particular aspect, the one or more processors 1220 of FIG. 12 correspond to the processor 2106, the processors 2110, or a combination thereof. The processors 2110 may include a speech and music coder-decoder (CODEC) 2108 that includes a voice coder ("vocoder") encoder 2136, a vocoder decoder 2138, the call manager 1222, the frame loss manager 1224, the pause manager 624, or a combination thereof.

The device 2100 may include a memory 2186 and a CODEC 2134. In a particular aspect, the memory 2186 corresponds to the memory 154, the memory 132 of FIG. 1, the memory 232 of FIG. 2, or a combination thereof. The memory 2186 may include instructions 2156, that are executable by the one or more additional processors 2110 (or the processor 2106) to implement the functionality described with reference to the call manager 1222, the frame loss manager 1224, the pause manager 624, or a combination thereof. The device 2100 may include a modem 2140 coupled, via a transceiver 2150, to an antenna 2152.

The device 2100 may include a display 2128 coupled to a display controller 2126. The speaker 129, the microphone 146, or both, may be coupled to the CODEC 2134. The CODEC 2134 may include a digital-to-analog converter (DAC) 2102, an analog-to-digital converter (ADC) 2104, or both. In a particular implementation, the CODEC 2134 may receive analog signals from the microphone 146, convert the analog signals to digital signals using the analog-to-digital converter 2104, and provide the digital signals to the speech and music codec 2108. The speech and music codec 2108 may process the digital signals, and the digital signals may further be processed by the call manager 1222. In a particular implementation, the speech and music codec 2108 may provide digital signals to the CODEC 2134. The CODEC 2134 may convert the digital signals to analog signals using the digital-to-analog converter 2102 and may provide the analog signals to the speaker 129.

In a particular implementation, the device 2100 may be included in a system-in-package or system-on-chip device 2122. In a particular implementation, the memory 2186, the processor 2106, the processors 2110, the display controller 2126, the CODEC 2134, the modem 2140, and the transceiver 2150 are included in a system-in-package or system-on-chip device 2122. In a particular implementation, an input device 2130 and a power supply 2144 are coupled to the system-on-chip device 2122. Moreover, in a particular implementation, as illustrated in FIG. 21, the display 2128, the input device 2130, the speaker 129, the microphone 146, the antenna 2152, and the power supply 2144 are external to the system-on-chip device 2122. In a particular implementation, each of the display 2128, the input device 2130, the speaker 129, the microphone 146, the antenna 2152, and the power supply 2144 may be coupled to a component of the system-on-chip device 2122, such as an interface or a controller.

The device 2100 may include a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a headset, a smart speaker, a speaker bar, a mobile communication device, a smart phone, a cellular phone, a laptop computer, a tablet, a personal digital assistant, a digital video disc (DVD) player, a tuner, a vehicle, an augmented reality headset, a virtual reality headset, a mixed reality headset, an aerial vehicle, a home automation system, a voice-activated device, a wireless speaker and voice activated device, a portable electronic device, a car, a computing device, a virtual reality (VR) device, a base station, a mobile device, or any combination thereof.

In conjunction with the described implementations, an apparatus includes means for receiving a sequence of audio frames during a call from a first device. For example, the means for receiving can correspond to the frame loss manager 124, the call manager 122, the one or more processors 120, the device 102 of FIG. 1, the one or more processors 1220, the call manager 1222, the frame loss manager 1224 of FIG. 12, the transceiver 2150, the modem 2140, the antenna 2152, the device 2100, one or more other circuits or components configured to receive a sequence of audio frames during a call, or any combination thereof.

The apparatus also includes means for initiating transmission of a frame loss indication to the first device, the transmission initiated in response to determining that no audio frame of the sequence has been received for a threshold duration since a last received audio frame of the sequence. For example, the means for initiating transmission of a frame loss indication can correspond to the frame loss manager 124, the call manager 122, the one or more processors 120, the device 102 of FIG. 1, the one or more processors 1220, the call manager 1222, the frame loss manager 1224 of FIG. 12, the transceiver 2150, the modem 2140, the antenna 2152, the device 2100, one or more other circuits or components configured to initiate transmission of a frame loss indication, or any combination thereof.

The apparatus further includes means for receiving a set of audio frames of the sequence and an indication of a second playback speed from the first device, the set of audio frames and the indication received responsive to the frame loss indication. For example, the means for receiving a set of audio frames can correspond to the frame loss manager 124, the call manager 122, the one or more processors 120, the device 102 of FIG. 1, the one or more processors 1220, the call manager 1222, the frame loss manager 1224 of FIG. 12, the transceiver 2150, the modem 2140, the antenna 2152, the device 2100, one or more other circuits or components configured to receive a set of audio frames, or any combination thereof.

The apparatus also includes means for initiating playback, via a speaker, of the set of audio frames based on the second playback speed, the second playback speed greater than a first playback speed of a first set of audio frames of the sequence. For example, the means for initiating playback can correspond to the frame loss manager 124, the call manager 122, the one or more processors 120, the device 102 of FIG. 1, the one or more processors 1220, the call manager 1222, the frame loss manager 1224 of FIG. 12, the processor 2106, the one or more processors 2110, the device 2100, one or more other circuits or components configured to initiate transmission of a frame loss indication, or any combination thereof.

Also in conjunction with the described implementations, an apparatus includes means for receiving a sequence of audio frames from a first device. For example, the means for receiving can correspond to the frame loss manager 124, the call manager 122, the one or more processors 120, the device 102 of FIG. 1, the pause manager 624 of FIG. 6, the one or more processors 1220, the call manager 1222, the frame loss manager 1224 of FIG. 12, the transceiver 2150, the modem 2140, the antenna 2152, the device 2100, one or more other circuits or components configured to receive a sequence of audio frames during a call, or any combination thereof.

The apparatus also includes means for initiating playback of a set of audio frames at least at a second playback speed in response to receiving a user request to resume playback and determining that the set of audio frames that is subsequent to a last played audio frame in the sequence is available, the second playback speed greater than a first playback speed of a first set of audio frames of the sequence. For example, the means for initiating playback can correspond to the frame loss manager 124, the call manager 122, the one or more processors 120, the device 102 of FIG. 1, the pause manager 624 of FIG. 6, the one or more processors 1220, the call manager 1222, the frame loss manager 1224 of FIG. 12, the device 2100, one or more other circuits or components configured to initiate playback of a set of audio frames, or any combination thereof.

Further in conjunction with the described implementations, an apparatus includes means for initiating transmission of a sequence of audio frames to a second device during a call. For example, the means for initiating transmission can correspond to the frame loss manager 156, the call manager 152, the one or more processors 150, the device 104 of FIG. 1, the call manager 222, the frame loss manager 224, the one or more processors 220, the server 204 of FIG. 2, the one or more processors 1220, the call manager 1222, the frame loss manager 1224 of FIG. 12, the transceiver 2150, the modem 2140, the antenna 2152, the device 2100, one or more other circuits or components configured to initiate transmission of a sequence of audio frames, or any combination thereof.

The apparatus also includes means for receiving a frame loss indication from the second device. For example, the means for receiving can correspond to the frame loss manager 156, the call manager 152, the one or more processors 150, the device 104 of FIG. 1, the call manager 222, the frame loss manager 224, the one or more processors 220, the server 204 of FIG. 2, the one or more processors 1220, the call manager 1222, the frame loss manager 1224 of FIG. 12, the transceiver 2150, the modem 2140, the antenna 2152, the device 2100, one or more other circuits or components configured to receive a frame loss indication, or any combination thereof.

The apparatus further includes means for determining, based on the frame loss indication, a last received audio frame of the sequence that was received by the second device. For example, the means for determining can correspond to the frame loss manager 156, the call manager 152, the one or more processors 150, the device 104 of FIG. 1, the call manager 222, the frame loss manager 224, the one or more processors 220, the server 204 of FIG. 2, the one or more processors 1220, the call manager 1222, the frame loss manager 1224 of FIG. 12, the device 2100, one or more other circuits or components configured to determine, based on the frame loss indication, a last received audio frame, or any combination thereof.

The apparatus also includes means for initiating transmission of a set of audio frames and an indication of a second playback speed of the set of audio frames to the second device, the transmission initiated based at least in part on determining that the set of audio frames that is subsequent to the last received audio frame in the sequence is available. The second playback speed is greater than a first playback speed of a first set of audio frames of the sequence. For example, the means for initiating transmission can correspond to the frame loss manager 156, the call manager 152, the one or more processors 150, the device 104 of FIG. 1, the call manager 222, the frame loss manager 224, the one or more processors 220, the server 204 of FIG. 2, the one or more processors 1220, the call manager 1222, the frame loss manager 1224 of FIG. 12, the transceiver 2150, the modem 2140, the antenna 2152, the device 2100, one or more other circuits or components configured to initiate transmission of a set of audio frames, or any combination thereof.

Also in conjunction with the described implementations, an apparatus includes means for initiating transmission of a sequence of audio frames to a second device during a call. For example, the means for initiating transmission can correspond to the frame loss manager 156, the call manager 152, the one or more processors 150, the device 104 of FIG. 1, the call manager 222, the frame loss manager 224, the one or more processors 220, the server 204 of FIG. 2, the one or more processors 1220, the call manager 1222, the frame loss manager 1224 of FIG. 12, the transceiver 2150, the modem 2140, the antenna 2152, the device 2100, one or more other circuits or components configured to initiate transmission of a sequence of audio frames, or any combination thereof.

The apparatus also includes means for receiving a frame loss indication from the second device. For example, the means for receiving can correspond to the frame loss manager 156, the call manager 152, the one or more processors 150, the device 104 of FIG. 1, the call manager 222, the frame loss manager 224, the one or more processors 220, the server 204 of FIG. 2, the one or more processors 1220, the call manager 1222, the frame loss manager 1224 of FIG. 12, the transceiver 2150, the modem 2140, the antenna 2152, the device 2100, one or more other circuits or components configured to receive a frame loss indication, or any combination thereof.

The apparatus further includes means for determining, based on the frame loss indication, a last received audio frame of the sequence that was received by the second device. For example, the means for determining can correspond to the frame loss manager 156, the call manager 152, the one or more processors 150, the device 104 of FIG. 1, the call manager 222, the frame loss manager 224, the one or more processors 220, the server 204 of FIG. 2, the one or more processors 1220, the call manager 1222, the frame loss manager 1224 of FIG. 12, the device 2100, one or more other circuits or components configured to determine, based on the frame loss indication, a last received audio frame, or any combination thereof.

The apparatus also includes means for generating an updated set of audio frames based on a set of audio frames so that a first playback speed of the updated set of audio frames corresponds to an effective second playback speed of the set of audio frames, the updated set of audio frames generated based at least in part on determining that the set of audio frames that is subsequent to the last received audio frame in the sequence is available. The effective second playback speed is greater than the first playback speed. For example, the means for generating can correspond to the frame loss manager 156, the one or more processors 150, the device 104 of FIG. 1, the frame loss manager 224, the one or more processors 220, the server 204 of FIG. 2, the one or more processors 1220, the frame loss manager 1224 of FIG. 12, the transceiver 2150, the modem 2140, the antenna 2152, the device 2100, one or more other circuits or components configured to generate an updated set of audio frames, or any combination thereof.

In some implementations, a non-transitory computer-readable medium (e.g., a computer-readable storage device, such as the memory 2186) includes instructions (e.g., the instructions 2156) that, when executed by one or more processors (e.g., the one or more processors 2110 or the processor 2106), cause the one or more processors to receive a sequence (e.g., the sequence 119) of audio frames from a first device (e.g., the device 104) during a call. The instructions, when executed by the one or more processors, also cause the one or more processors to, in response to determining that no audio frame of the sequence has been received for a threshold duration since a last received audio frame (e.g., the audio frame 111) of the sequence, initiate transmission of a frame loss indication (e.g., the frame loss indication 121) to the first device. The instructions, when executed by the one or more processors, further cause the one or more processors to, responsive to the frame loss indication, receive a set of audio frames (e.g., the set of audio frames 113) of the sequence and an indication of a second playback speed (e.g., the second playback speed 115) from the first device. The instructions, when executed by the one or more processors, also cause the one or more processors to initiate playback, via a speaker (e.g., the speaker 129), of the set of audio frames based on the second playback speed. The second playback speed is greater than a first playback speed (e.g., the first playback speed 105) of a first set of audio frames (e.g., the set of audio frames 109) of the sequence.

In some implementations, a non-transitory computer-readable medium (e.g., a computer-readable storage device, such as the memory 2186) includes instructions (e.g., the instructions 2156) that, when executed by one or more processors (e.g., the one or more processors 2110 or the processor 2106), cause the one or more processors to receive a sequence (e.g., the sequence 119) of audio frames from a first device (e.g., the device 104) during a call. The instructions, when executed by the one or more processors, also cause the one or more processors to, in response to receiving a user request (e.g., the resume command 622) to resume playback and determining that a set of audio frames (e.g., the set of audio frames 113) that is subsequent to a last played audio frame (e.g., the audio frame 111) in the sequence is available, initiate playback of the set of audio frames based on a second playback speed (e.g., the second playback speed 115). The second playback speed greater than a first playback speed (e.g., the first playback speed 105) of a first set of audio frames (e.g., the set of audio frames 109) of the sequence.

In some implementations, a non-transitory computer-readable medium (e.g., a computer-readable storage device, such as the memory 2186) includes instructions (e.g., the instructions 2156) that, when executed by one or more processors (e.g., the one or more processors 2110 or the processor 2106), cause the one or more processors to initiate transmission of a sequence (e.g., the sequence 119) of audio frames to a second device (e.g., the device 102) during a call. The instructions, when executed by the one or more processors, also cause the one or more processors to receive a frame loss indication (e.g., the frame loss indication 121) from the second device (e.g., the device 102). The instructions, when executed by the one or more processors, further cause the one or more processors to determine, based on the frame loss indication, a last received audio frame (e.g., the audio frame 111) of the sequence that was received by the second device. The instructions, when executed by the one or more processors, also cause the one or more processors to, based at least in part on determining that a set of audio frames (e.g., the set of audio frames 113) that is subsequent to the last received audio frame in the sequence is available, initiate transmission of the set of audio frames and an indication of a second playback speed (e.g., the second playback speed 115) of the set of audio frames to the second device. The second playback speed is greater than a first playback speed (e.g., the first playback speed 105) of a first set of audio frames (e.g., the set of audio frames 109) of the sequence.

In some implementations, a non-transitory computer-readable medium (e.g., a computer-readable storage device, such as the memory 2186) includes instructions (e.g., the instructions 2156) that, when executed by one or more processors (e.g., the one or more processors 2110 or the processor 2106), cause the one or more processors to initiate transmission of a sequence (e.g., the sequence 119) of audio frames to a second device (e.g., the device 102) during a call. The instructions, when executed by the one or more processors, also cause the one or more processors to receive a frame loss indication (e.g., the frame loss indication 121) from the second device (e.g., the device 102). The instructions, when executed by the one or more processors, further cause the one or more processors to determine, based on the frame loss indication, a last received audio frame (e.g., the audio frame 111) of the sequence that was received by the second device. The instructions, when executed by the one or more processors, also cause the one or more processors to, based at least in part on determining that a set of audio frames (e.g., the set of audio frames 113) that is subsequent to the last received audio frame in the sequence is available, generate an updated set of audio frames (e.g., the set of audio frames 123) based on the set of audio frames so that a first playback speed (e.g., the first playback speed 105) of the updated set of audio frames corresponds to an effective second playback speed (e.g., the second playback speed 115) of the set of audio frames. The effective second playback speed is greater than the first playback speed.

Particular aspects of the disclosure are described below in a first set of interrelated clauses:

According to Clause 1, a device for communication comprises one or more processors configured to, during a call: receive a sequence of audio frames from a first device; in response to determining that no audio frame of the sequence has been received for a threshold duration since a last received audio frame of the sequence, initiate transmission of a frame loss indication to the first device; responsive to the frame loss indication, receive a set of audio frames of the sequence and an indication of a second playback speed from the first device; and initiate playback, via a speaker, of the set of audio frames based on the second playback speed, the second playback speed greater than a first playback speed of a first set of audio frames of the sequence.

Clause 2 includes the device of Clause 1, wherein initiating playback of the set of audio frames at the second playback speed includes at least partially suppressing silence indicated by the set of audio frames.

Clause 3 includes the device of Clause 1 or Clause 2, wherein the one or more processors are further configured to: receive next audio frames of the sequence from the first device, the next audio frames subsequent to the set of audio frames in the sequence; and transition playback of the next audio frames from the second playback speed to the first playback speed.

Clause 4 includes the device of any of Clause 1 to Clause 3, wherein the one or more processors are further configured to: store the set of audio frames in a buffer; receive next audio frames of the sequence from the first device and store the next audio frames in the buffer, the next audio frames subsequent to the set of audio frames in the sequence; and transition playback from the second playback speed to the first playback speed in response to determining that fewer than a threshold count of audio frames of the sequence are stored in the buffer for playback.

Clause 5 includes the device of any of Clause 1 to Clause 4, wherein the one or more processors are further configured to receive next audio frames of the sequence from the first device concurrently with receiving the set of audio frames from the first device, the next audio frames subsequent to the set of audio frames in the sequence.

Clause 6 includes the device of any of Clause 1 to Clause 5, wherein the one or more processors are configured to determine, at a particular time, that audio frames corresponding to a particular playback duration at the first playback speed have not been received since the last received audio frame, wherein the particular playback duration is based on the particular time and a receipt time of the last received frame, and wherein the frame loss indication includes a request to retransmit previous audio frames corresponding to the particular playback duration at the first playback speed.

Clause 7 includes the device of any of Clause 1 to Clause 6, wherein the frame loss indication indicates the last received audio frame.

Clause 8 includes the device of any of Clause 1 to Clause 6, wherein the second playback speed is based on a count of the set of audio frames.

Clause 9 includes the device of any of Clause 1 to Clause 8, wherein the one or more processors are configured to, in response to determining that the set of audio frames includes a silence frame, initiate playback of the silence frame at a greater playback speed than the second playback speed.

Clause 10 includes the device of any of Clause 1 to Clause 9, wherein the one or more processors are integrated into at least one of a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a headset, or a combination thereof.

Particular aspects of the disclosure are described below in a second set of interrelated clauses:

According to Clause 11, a method of communication comprises, during a call: receiving, at a device, a sequence of audio frames from a first device; in response to determining that no audio frame of the sequence has been received at the device for a threshold duration since a last received audio frame of the sequence, initiating transmission of a frame loss indication from the device to the first device; responsive to the frame loss indication, receiving, at the device, a set of audio frames of the sequence and an indication of a second playback speed from the first device; and initiating playback, via a speaker, of the set of audio frames based on the second playback speed, the second playback speed greater than a first playback speed of a first set of audio frames of the sequence.

Clause 12 includes the method of Clause 11, wherein the first device includes a server, wherein the call is with multiple second devices, and wherein the sequence of audio frames is based on multiple sequences of audio frames received by the first device from the multiple second devices.

Clause 13 includes the method of Clause 11, wherein the call is between the device and a single additional device, and wherein the single additional device includes the first device.

Clause 14 includes the method of any of Clauses 11 to 13, further comprising receiving next audio frames of the sequence at the device from the first device concurrently with receiving the set of audio frames at the device from the first device, the next audio frames subsequent to the set of audio frames in the sequence.

Particular aspects of the disclosure are described below in a third set of interrelated clauses:

According to Clause 15, a device for communication comprises: one or more processors configured to, during a call: receive a sequence of audio frames from a first device; and in response to receiving a user request to resume playback and determining that a set of audio frames that is subsequent to a last played audio frame in the sequence is available, initiate playback of the set of audio frames based on a second playback speed, the second playback speed greater than a first playback speed of a first set of audio frames of the sequence.

Clause 16 includes the device of Clause 15, wherein initiating playback of the set of audio frames at the second playback speed includes at least partially suppressing silence indicated by the set of audio frames.

Clause 17 includes the device of Clause 15 or Clause 16, wherein the one or more processors are further configured to: receive next audio frames of the sequence from the first device, the next audio frames subsequent to the set of audio frames in the sequence; and transition playback of the next audio frames from the second playback speed to the first playback speed.

Clause 18 includes the device of any of Clause 15 to Clause 17, wherein the one or more processors are further configured to: store the set of audio frames in a buffer; receive next audio frames of the sequence from the first device and store the next audio frames in the buffer, the next audio frames subsequent to the set of audio frames in the sequence; and transition playback from the second playback speed to the first playback speed in response to determining that fewer than a threshold count of audio frames of the sequence are stored in the buffer for playback.

Clause 19 includes the device of any of Clause 15 to Clause 18, wherein the second playback speed is based on a count of the set of audio frames.

Clause 20 includes the device of any of Clause 15 to Clause 18, wherein the user request is received at a resume time, and wherein the second playback speed is based on a pause duration between a playback time of the last played audio frame and the resume time.

Clause 21 includes the device of any of Clause 15 to Clause 20, wherein the one or more processors are configured to, in response to determining that the set of audio frames includes a silence frame, initiate playback of the silence frame at a greater playback speed than the second playback speed.

Clause 22 includes the device of any of Clause 15 to Clause 21, wherein the one or more processors are integrated into at least one of a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a headset, or a combination thereof.

Particular aspects of the disclosure are described below in a fourth set of interrelated clauses:

According to Clause 23, a method of communication comprises, during a call: receiving, at a device, a sequence of audio frames from a first device; and in response to receiving a user request to resume playback and determining that a set of audio frames that is subsequent to a last played audio frame in the sequence is available, initiating playback at the device of the set of audio frames at least at a second playback speed, the second playback speed greater than a first playback speed of a first set of audio frames of the sequence.

Clause 24 includes the method of Clause 23, wherein initiating playback of the set of audio frames at the second playback speed includes at least partially suppressing silence indicated by the set of audio frames.

Clause 25 includes the method of Clause 23 or Clause 24, further comprising: receiving, at the device, next audio frames of the sequence from the first device, the next audio frames subsequent to the set of audio frames in the sequence; and transitioning, at the device, playback of the next audio frames from the second playback speed to the first playback speed.

Clause 26 includes the method of any of Clause 23 to Clause 25, further comprising: storing the set of audio frames in a buffer; receiving next audio frames of the sequence at the device from the first device; storing the next audio frames in the buffer, the next audio frames subsequent to the set of audio frames in the sequence; and transitioning, at the device, playback from the second playback speed to the first playback speed in response to determining that fewer than a threshold count of audio frames of the sequence are stored in the buffer for playback.

Clause 27 includes the method of any of Clause 23 to Clause 26, wherein the second playback speed is based on a count of the set of audio frames.

Clause 28 includes the method of any of Clause 23 to Clause 26, wherein the user request is received at a resume time, and wherein the second playback speed is based on a pause duration between a playback time of the last played audio frame and the resume time.

Clause 29 includes the method of any of Clause 23 to Clause 28, further comprising, in response to determining that the set of audio frames includes a silence frame, initiating at the device playback of the silence frame at a greater playback speed than the second playback speed.

Clause 30 includes the method of any of Clause 23 to Clause 29, wherein the first device includes a server, wherein the call is with multiple second devices, and wherein the sequence of audio frames is based on multiple sequences of audio frames received by the first device from the multiple second devices.

Particular aspects of the disclosure are described below in a fifth set of interrelated clauses:

According to Clause 31, a non-transitory computer-readable medium stores instructions that, when executed by one or more processors, causes the one or more processors to, during a call: receive a sequence of audio frames from a first device; in response to determining that no audio frame of the sequence has been received for a threshold duration since a last received audio frame of the sequence, initiate transmission of a frame loss indication to the first device; responsive to the frame loss indication, receive a set of audio frames of the sequence and an indication of a second playback speed from the first device; and initiate playback, via a speaker, of the set of audio frames based on the second playback speed, the second playback speed greater than a first playback speed of a first set of audio frames of the sequence.

Clause 32 includes the non-transitory computer-readable medium of Clause 31, wherein initiating playback of the set of audio frames at the second playback speed includes at least partially suppressing silence indicated by the set of audio frames.

Particular aspects of the disclosure are described below in a sixth set of interrelated clauses:

According to Clause 33, a non-transitory computer-readable medium stores instructions that, when executed by one or more processors, causes the one or more processors to, during a call: receive a sequence of audio frames from a first device; and in response to receiving a user request to resume playback and determining that a set of audio frames that is subsequent to a last played audio frame in the sequence is available, initiate playback of the set of audio frames based on a second playback speed, the second playback speed greater than a first playback speed of a first set of audio frames of the sequence.

Clause 34 includes the non-transitory computer-readable medium of Clause 33, wherein initiating playback of the set of audio frames at the second playback speed includes at least partially suppressing silence indicated by the set of audio frames.

Particular aspects of the disclosure are described below in a seventh set of interrelated clauses:

According to Clause 35, an apparatus comprises: means for receiving a sequence of audio frames during a call from a first device; means for initiating transmission of a frame loss indication to the first device, the transmission initiated in response to determining that no audio frame of the sequence has been received for a threshold duration since a last received audio frame of the sequence; means for receiving a set of audio frames of the sequence and an indication of a second playback speed from the first device, the set of audio frames and the indication received responsive to the frame loss indication; and means for initiating playback, via a speaker, of the set of audio frames based on the second playback speed, the second playback speed greater than a first playback speed of a first set of audio frames of the sequence.

Clause 36 includes the apparatus of Clause 35, wherein the means for receiving the sequence, the means for initiating transmission of the frame loss indication, the means for receiving the set of audio frames, and the means for initiating playback are integrated into at least one of a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a headset, or a combination thereof.

Particular aspects of the disclosure are described below in an eighth set of interrelated clauses:

According to Clause 37, an apparatus comprises: means for receiving a sequence of audio frames during a call from a first device; and means for initiating playback of a set of audio frames based on a second playback speed, the playback initiated in response to receiving a user request to resume playback and determining that the set of audio frames that is subsequent to a last played audio frame in the sequence is available, wherein the second playback speed is greater than a first playback speed of a first set of audio frames of the sequence.

Clause 38 includes the apparatus of Clause 37, wherein the means for receiving and the means for initiating playback are integrated into at least one of a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a headset, or a combination thereof.

Particular aspects of the disclosure are described below in a ninth set of interrelated clauses:

According to Clause 39, a device for communication comprises: one or more processors configured to, during a call: initiate transmission of a sequence of audio frames to a second device; receive a frame loss indication from the second device; determine, based on the frame loss indication, a last received audio frame of the sequence that was received by the second device; and based at least in part on determining that a set of audio frames that is subsequent to the last received audio frame in the sequence is available, initiate transmission of the set of audio frames and an indication of a second playback speed of the set of audio frames to the second device, the second playback speed greater than a first playback speed of a first set of audio frames of the sequence.

Clause 40 includes the device of Clause 39, wherein the one or more processors are integrated into a server.

Clause 41 includes the device of Clause 39 or Clause 40, wherein the frame loss indication includes a request to retransmit previous audio frames corresponding to a particular playback duration at the first playback speed, wherein the one or more processors are configured to determine the last received audio frame based on the particular playback duration, and wherein the one or more processors are configured to initiate transmission of the set of audio frames based at least in part on determining that the previous audio frames include the set of audio frames.

Clause 42 includes the device of any of Clause 39 to Clause 41, further comprising a buffer, the one or more processors configured to receive the sequence of audio frames from a first device, wherein the transmission of the set of audio frames is initiated based at least in part on determining that the set of audio frames is available in the buffer.

Clause 43 includes the device of any of Clause 39 to Clause 42, wherein the one or more processors are further configured to initiate transmission of next audio frames of the sequence concurrently while transmitting the set of audio frames.

Clause 44 includes the device of Clause 43, wherein the next audio frames are associated with a transition to the first playback speed following playback of the set of audio frames at the second playback speed.

Clause 45 includes the device of any of Clause 39 to Clause 44, wherein the first set of audio frames is prior to the last received audio frame in the sequence.

Clause 46 includes the device of any of Clause 39 to Clause 45, wherein the one or more processors are configured to selectively initiate transmission of the set of audio frames in response to determining that a count of the set of audio frames is less than a threshold.

Clause 47 includes the device of any of Clause 39 to Clause 46, wherein the one or more processors are configured to determine the second playback speed based on a count of the set of audio frames.

Clause 48 includes the device of any of Clause 39 to Clause 47, wherein the one or more processors are configured to initiate the transmission of the set of audio frames based at least in part on determining that a network link is reestablished with the second device.

Clause 49 includes the device of any of Clause 39 to Clause 48, wherein the set of audio frames includes a silence frame, wherein the one or more processors are further configured to transmit an indication of a third playback speed for the silence frame, and wherein the third playback speed is greater than the second playback speed.

Particular aspects of the disclosure are described below in a tenth set of interrelated clauses:

According to clause 50, a device for communication comprises: one or more processors configured to, during a call: initiate transmission of a sequence of audio frames to a second device; receive a frame loss indication from the second device; determine, based on the frame loss indication, a last received audio frame of the sequence that was received by the second device; and based at least in part on determining that a set of audio frames that is subsequent to the last received audio frame in the sequence is available, generate an updated set of audio frames based on the set of audio frames so that a first playback speed of the updated set of audio frames corresponds to an effective second playback speed of the set of audio frames, the effective second playback speed greater than the first playback speed.

Clause 51 includes the device of Clause 50, wherein the one or more processors are configured to generate the updated set of audio frames by selecting a subset of the set of audio frames such that the subset has the same playback duration at the first playback speed as the set of audio frames at the second playback speed.

Clause 52 includes the device of Clause 50 or Clause 51, wherein the one or more processors are integrated into a server.

Clause 53 includes the device of any of Clause 50 to Clause 52, wherein the frame loss indication includes a request to retransmit previous audio frames corresponding to a particular playback duration at the first playback speed, wherein the one or more processors are configured to determine the last received audio frame based on the particular playback duration, and wherein the one or more processors are configured to initiate transmission of the updated set of audio frames based at least in part on determining that the previous audio frames include the set of audio frames.

Clause 54 includes the device of any of Clause 50 to Clause 53, further comprising a buffer, the one or more processors configured to receive the sequence of audio frames from a first device, wherein the transmission of the updated set of audio frames is initiated based at least in part on determining that the set of audio frames is available in the buffer.

Clause 55 includes the device of any of Clause 50 to Clause 54, wherein the one or more processors are further configured to initiate transmission of next audio frames of the sequence concurrently while transmitting the updated set of audio frames.

Clause 56 includes the device of any of Clause 50 to Clause 55, wherein the one or more processors are configured to selectively initiate transmission of the updated set of audio frames in response to determining that a count of the set of audio frames is less than a threshold.

Clause 57 includes the device of any of Clause 50 to Clause 56, wherein the one or more processors are configured to determine the effective second playback speed based on a count of the set of audio frames.

Clause 58 includes the device of any of Clause 50 to Clause 57, wherein the one or more processors are configured to initiate the transmission of the updated set of audio frames based at least in part on determining that a network link is reestablished with the second device.

Clause 59 includes the device of any of Clause 50 to Clause 58, wherein generating the updated set of audio frames includes suppressing at least a portion of silence indicated in the set of audio frames.

Particular aspects of the disclosure are described below in an eleventh set of interrelated clauses:

According to Clause 61, a method of communication comprises, during a call: initiating transmission of a sequence of audio frames from a first device to a second device; receiving a frame loss indication at the first device from the second device; determining, based on the frame loss indication, a last received audio frame of the sequence that was received by the second device; and based at least in part on determining that a set of audio frames that is subsequent to the last received audio frame in the sequence is available, initiating transmission of the set of audio frames and an indication of a second playback speed of the set of audio frames from the first device to the second device, the second playback speed greater than a first playback speed of a first set of audio frames of the sequence.

Clause 62 includes the method of Clause 61, wherein the first device is integrated into a server.

Particular aspects of the disclosure are described below in a twelfth set of interrelated clauses:

According to clause 63, a method of communication comprises, during a call: initiating transmission of a sequence of audio frames to a second device; receiving a frame loss indication from the second device; determining, based on the frame loss indication, a last received audio frame of the sequence that was received by the second device; and based at least in part on determining that a set of audio frames that is subsequent to the last received audio frame in the sequence is available, generating an updated set of audio frames based on the set of audio frames so that a first playback speed of the updated set of audio frames corresponds to an effective second playback speed of the set of audio frames, the effective second playback speed greater than the first playback speed.

Clause 64 includes the method of Clause 63, wherein generating the updated set of audio frames includes selecting a subset of the set of audio frames such that the subset has the same playback duration at the first playback speed as the set of audio frames at the second playback speed.

Particular aspects of the disclosure are described below in a thirteenth set of interrelated clauses:

According to Clause 65, a non-transitory computer-readable storage medium stores instructions that, when executed by one or more processors, cause the one or more processors to, during a call: initiate transmission of a sequence of audio frames to a second device; receive a frame loss indication from the second device; determine, based on the frame loss indication, a last received audio frame of the sequence that was received by the second device; and based at least in part on determining that a set of audio frames that is subsequent to the last received audio frame in the sequence is available, initiate transmission of the set of audio frames and an indication of a second playback speed of the set of audio frames to the second device, the second playback speed greater than a first playback speed of a first set of audio frames of the sequence.

Clause 66 includes the non-transitory computer-readable storage medium of Clause 65, wherein the one or more processors are integrated into a server.

Particular aspects of the disclosure are described below in a fourteenth set of interrelated clauses:

According to clause 67, a non-transitory computer-readable storage medium stores instructions that, when executed by one or more processors, cause the one or more processors to, during a call: initiate transmission of a sequence of audio frames to a second device; receive a frame loss indication from the second device; determining, based on the frame loss indication, a last received audio frame of the sequence that was received by the second device; and based at least in part on determining that a set of audio frames that is subsequent to the last received audio frame in the sequence is available, generate an updated set of audio frames based on the set of audio frames so that a first playback speed of the updated set of audio frames corresponds to an effective second playback speed of the set of audio frames, the effective second playback speed greater than the first playback speed.

Clause 68 includes the non-transitory computer-readable storage medium of Clause 67, wherein generating the updated set of audio frames includes selecting a subset of the set of audio frames such that the subset has the same playback duration at the first playback speed as the set of audio frames at the second playback speed.

Particular aspects of the disclosure are described below in a fifteenth set of interrelated clauses:

According to Clause 69, an apparatus comprises: means for initiating transmission of a sequence of audio frames during a call to a second device; means for receiving a frame loss indication from the second device; means for determining, based on the frame loss indication, a last received audio frame of the sequence that was received by the second device; and means for initiating transmission of a set of audio frames and an indication of a second playback speed of the set of audio frames to the second device, the transmission initiated based at least in part on determining that the set of audio frames that is subsequent to the last received audio frame in the sequence is available, wherein the second playback speed is greater than a first playback speed of a first set of audio frames of the sequence.

Clause 70 includes the apparatus of Clause 69, wherein the means for initiating transmission of the sequence of audio frames, the means for determining, and the means for initiating transmission of the set of audio frames and the indication are integrated into at least one of a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a headset, or a combination thereof.

Particular aspects of the disclosure are described below in a sixteenth set of interrelated clauses:

According to clause 71, an apparatus comprises: means for initiating transmission of a sequence of audio frames during a call to a second device; means for receiving a frame loss indication from the second device; means for determining, based on the frame loss indication, a last received audio frame of the sequence that was received by the second device; and means for generating an updated set of audio frames based on a set of audio frames so that a first playback speed of the updated set of audio frames corresponds to an effective second playback speed of the set of audio frames, the updated set of audio frames generated based at least in part on determining that the set of audio frames that is subsequent to the last received audio frame in the sequence is available, wherein the effective second playback speed is greater than the first playback speed.

Clause 72 includes the apparatus of Clause 71, wherein the means for initiating transmission of the sequence of audio frames, the means for receiving the frame loss indication, the means for determining, and the means for generating the updated set of audio frames are integrated into at least one of a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a headset, or a combination thereof.

Those of skill would further appreciate that the various illustrative logical blocks, configurations, modules, circuits, and algorithm steps described in connection with the implementations disclosed herein may be implemented as electronic hardware, computer software executed by one or more processors, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by one or more processors, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device for communication comprising:
one or more processors configured to, during a call:
receive a first set of audio frames of a sequence of audio frames from a first device;
in response to determining that no audio frame of the sequence has been received for a threshold duration since a last received audio frame of the sequence, initiate transmission of a frame loss indication to the first device;
responsive to the frame loss indication, receive a second set of audio frames of the sequence and an indication of a second playback speed from the first device; and
initiate playback, via a speaker, of the second set of audio frames based on the second playback speed, the second playback speed greater than a first playback speed of the first set of audio frames.

2. The device of claim 1, wherein initiating playback of the second set of audio frames at the second playback speed includes at least partially suppressing silence indicated by the second set of audio frames.

3. The device of claim 1, wherein the one or more processors are further configured to:
receive next audio frames of the sequence from the first device, the next audio frames subsequent to the second set of audio frames in the sequence; and
transition playback of the next audio frames from the second playback speed to the first playback speed.

4. The device of claim 1, wherein the one or more processors are further configured to:
store the second set of audio frames in a buffer;
receive next audio frames of the sequence from the first device and store the next audio frames in the buffer, the next audio frames subsequent to the second set of audio frames in the sequence; and
transition playback from the second playback speed to the first playback speed in response to determining that fewer than a threshold count of audio frames of the sequence are stored in the buffer for playback.

5. The device of claim 1, wherein the one or more processors are further configured to receive next audio frames of the sequence from the first device concurrently with receiving the second set of audio frames from the first device, the next audio frames subsequent to the second set of audio frames in the sequence.

6. The device of claim 1, wherein the one or more processors are configured to determine, at a particular time, that audio frames corresponding to a particular playback duration at the first playback speed have not been received since the last received audio frame, wherein the particular playback duration is based on the particular time and a receipt time of the last received audio frame, and wherein the frame loss indication includes a request to retransmit previous audio frames corresponding to the particular playback duration at the first playback speed.

7. The device of claim 1, wherein the frame loss indication indicates the last received audio frame.

8. The device of claim 1, wherein the second playback speed is based on a count of the second set of audio frames.

9. The device of claim 1, wherein the one or more processors are configured to, in response to determining that the second set of audio frames includes a silence frame, initiate playback of the silence frame at a greater playback speed than the second playback speed.

10. The device of claim 1, wherein the one or more processors are integrated into at least one of a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a headset, or a combination thereof.

11. A method of communication comprising, during a call:
receiving, at a device, a first set of audio frames of a sequence of audio frames from a first device;
in response to determining that no audio frame of the sequence has been received at the device for a threshold duration since a last received audio frame of the sequence, initiating transmission of a frame loss indication from the device to the first device;
responsive to the frame loss indication, receiving, at the device, a second set of audio frames of the sequence and an indication of a second playback speed from the first device; and
initiating playback, via a speaker, of the second set of audio frames based on the second playback speed, the second playback speed greater than a first playback speed of the first set of audio frames.

12. The method of claim 11, wherein the first device includes a server, wherein the call is with multiple second devices, and wherein the sequence of audio frames is based on multiple sequences of audio frames received by the first device from the multiple second devices.

13. The method of claim 11, wherein the call is between the device and a single additional device, and wherein the single additional device includes the first device.

14. The method of claim 11, further comprising receiving next audio frames of the sequence at the device from the first device concurrently with receiving the second set of audio frames at the device from the first device, the next audio frames subsequent to the second set of audio frames in the sequence.

15. A device for communication comprising:
one or more processors configured to, during a call:
receive a first set of audio frames of a sequence of audio frames from a first device; and
in response to receiving a user request to resume playback and determining that a second set of audio frames that is subsequent to a last played audio frame in the sequence is available, initiate playback of the second set of audio frames based on a second playback speed, the second playback speed greater than a first playback speed of the first set of audio frames.

16. The device of claim 15, wherein initiating playback of the second set of audio frames at the second playback speed includes at least partially suppressing silence indicated by the second set of audio frames.

17. The device of claim 15, wherein the one or more processors are further configured to:
receive next audio frames of the sequence from the first device, the next audio frames subsequent to the second set of audio frames in the sequence; and
transition playback of the next audio frames from the second playback speed to the first playback speed.

18. The device of claim 15, wherein the one or more processors are further configured to:
store the second set of audio frames in a buffer;
receive next audio frames of the sequence from the first device and store the next audio frames in the buffer, the next audio frames subsequent to the second set of audio frames in the sequence; and
transition playback from the second playback speed to the first playback speed in response to determining that fewer than a threshold count of audio frames of the sequence are stored in the buffer for playback.

19. The device of claim 15, wherein the second playback speed is based on a count of the second set of audio frames.

20. The device of claim 15, wherein the user request is received at a resume time, and wherein the second playback speed is based on a pause duration between a playback time of the last played audio frame and the resume time.

21. The device of claim 15, wherein the one or more processors are configured to, in response to determining that the second set of audio frames includes a silence frame, initiate playback of the silence frame at a greater playback speed than the second playback speed.

22. The device of claim 15, wherein the one or more processors are integrated into at least one of a virtual assistant, a home appliance, a smart device, an internet of things (IoT) device, a communication device, a computer, a display device, a television, a gaming console, a music player, a radio, a video player, an entertainment unit, a personal media player, a digital video player, a camera, a navigation device, a headset, or a combination thereof.

23. A method of communication comprising, during a call:
receiving, at a device, a first set of audio frames of a sequence of audio frames from a first device; and
in response to receiving a user request to resume playback and determining that a second set of audio frames that is subsequent to a last played audio frame in the sequence is available, initiating playback at the device of the second set of audio frames at least at a second playback speed, the second playback speed greater than a first playback speed of the first set of audio frames.

24. The method of claim 23, wherein initiating playback of the second set of audio frames at the second playback speed includes at least partially suppressing silence indicated by the second set of audio frames.

25. The method of claim 23, further comprising:
receiving, at the device, next audio frames of the sequence from the first device, the next audio frames subsequent to the second set of audio frames in the sequence; and
transitioning, at the device, playback of the next audio frames from the second playback speed to the first playback speed.

26. The method of claim 23, further comprising:
storing the second set of audio frames in a buffer;
receiving next audio frames of the sequence at the device from the first device;
storing the next audio frames in the buffer, the next audio frames subsequent to the second set of audio frames in the sequence; and
transitioning, at the device, playback from the second playback speed to the first playback speed in response to determining that fewer than a threshold count of audio frames of the sequence are stored in the buffer for playback.

27. The method of claim 23, wherein the second playback speed is based on a count of the second set of audio frames.

28. The method of claim 23, wherein the user request is received at a resume time, and wherein the second playback speed is based on a pause duration between a playback time of the last played audio frame and the resume time.

29. The method of claim 23, further comprising, in response to determining that the second set of audio frames includes a silence frame, initiating at the device playback of the silence frame at a greater playback speed than the second playback speed.

30. The method of claim 23, wherein the first device includes a server, wherein the call is with multiple second devices, and wherein the sequence of audio frames is based on multiple sequences of audio frames received by the first device from the multiple second devices.

\* \* \* \* \*